US012794912B2

(12) United States Patent
Yasmin et al.

(10) Patent No.: US 12,794,912 B2
(45) Date of Patent: Nov. 10, 2026

(54) INTRUSION MONITORING SYSTEM, METHOD AND RELATED PRODUCTS

(71) Applicant: Yinwang Intelligent Technologies Co., Ltd., Guangdong (CN)

(72) Inventors: Rehana Yasmin, Singapore (SG); Zhuo Wei, Singapore (SG); Suk In Kang, Singapore (SG); Feng Geng, Suzhou (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 247 days.

(21) Appl. No.: 18/186,040

(22) Filed: Mar. 17, 2023

(65) Prior Publication Data

US 2023/0231864 A1 Jul. 20, 2023

Related U.S. Application Data

(63) Continuation of application No. PCT/CN2020/116322, filed on Sep. 18, 2020.

(51) Int. Cl.
*H04L 9/40* (2022.01)
*H04L 12/40* (2006.01)

(52) U.S. Cl.
CPC ...... *H04L 63/1425* (2013.01); *H04L 63/1416* (2013.01); *H04L 63/1441* (2013.01); *H04L 2012/40215* (2013.01)

(58) Field of Classification Search
CPC ............. H04L 63/1425; H04L 63/1416; H04L 63/1441
See application file for complete search history.

(56) References Cited

U.S. PATENT DOCUMENTS

2007/0240213 A1 10/2007 Karam et al.
2016/0021059 A1 1/2016 Pietrowicz et al.
(Continued)

FOREIGN PATENT DOCUMENTS

CN 1450757 A 10/2003
CN 1564530 A 1/2005
(Continued)

OTHER PUBLICATIONS

Matsumoto, Tsutomu; Hata, Masato; Tanabe, Masato; Yoshioka, Katsunari; Oishi, Kazuomi; "A Method of Preventing Unauthorized Data Transmission in Controller Area Network," 75th Vehicular Technology Conference (VTC Spring), Yokohama, Japan, May 6-9, 2012, IEEE, pp. 1-5.*
(Continued)

*Primary Examiner* — Victor Lesniewski
(74) *Attorney, Agent, or Firm* — Leydig, Voit & Mayer, Ltd.

(57) ABSTRACT

The present disclosure provides an intrusion monitoring system, an intrusion monitoring method and related products. The intrusion monitoring system includes: a first monitoring component deployed in a controller area network, a second monitoring component deployed in an Ethernet network, and a first control component; the first monitoring component is configured to obtain first CAN reporting information on data traffic in the system and transmit the first CAN reporting information to the first control component; the second monitoring component is configured to obtain second Ethernet reporting information on the data traffic and transmit the second Ethernet reporting information to the first control component; and the first control component is configured to receive the first CAN reporting information from the first monitoring component and the second Ether-
(Continued)

net reporting information from the second monitoring component, and determine whether the data traffic is an attack.

20 Claims, 13 Drawing Sheets

(56) References Cited

U.S. PATENT DOCUMENTS

| | | | | |
|---|---|---|---|---|
| 2016/0315958 | A1* | 10/2016 | Munetoh | H04L 63/1425 |
| 2017/0013005 | A1 | 1/2017 | Galula et al. | |
| 2018/0131712 | A1* | 5/2018 | Cornelio | H04L 63/14 |
| 2019/0081966 | A1* | 3/2019 | Ploucha | H04L 63/1425 |
| 2019/0379683 | A1* | 12/2019 | Overby | G06F 9/45533 |
| 2020/0053112 | A1* | 2/2020 | Torisaki | H04L 63/1425 |
| 2020/0128031 | A1* | 4/2020 | Juliato | G05B 19/0421 |
| 2020/0145433 | A1 | 5/2020 | Gutierrez et al. | |
| 2020/0183373 | A1 | 6/2020 | Choi et al. | |
| 2020/0220888 | A1 | 7/2020 | Terazawa et al. | |
| 2020/0234101 | A1* | 7/2020 | Hanselmann | G06N 3/044 |
| 2020/0342099 | A1* | 10/2020 | Kerstein | H04L 63/1425 |
| 2021/0021618 | A1* | 1/2021 | Tanaka | H04L 63/0236 |
| 2021/0075807 | A1* | 3/2021 | Park | H04L 9/0891 |
| 2021/0185070 | A1* | 6/2021 | Jeon | H04L 12/66 |
| 2021/0258352 | A1* | 8/2021 | Leuwer | H04L 63/0227 |
| 2021/0392109 | A1* | 12/2021 | Hamada | H04L 63/1425 |
| 2022/0006666 | A1* | 1/2022 | Liu | H04W 4/48 |
| 2022/0182404 | A1* | 6/2022 | Kishikawa | H04L 63/02 |
| 2022/0278994 | A1* | 9/2022 | Kim | H04L 47/2441 |
| 2022/0337494 | A1* | 10/2022 | Kishikawa | H04L 43/026 |
| 2023/0396634 | A1* | 12/2023 | Fang | H04L 67/75 |
| 2024/0137373 | A1* | 4/2024 | Klapper | H04L 67/12 |
| 2024/0391401 | A1* | 11/2024 | Ujiie | H04L 12/40084 |

FOREIGN PATENT DOCUMENTS

| | | | |
|---|---|---|---|
| CN | 101465770 | A | 6/2009 |
| CN | 107667505 | A | 2/2018 |
| CN | 109100159 | A | 12/2018 |
| CN | 111245806 | A | 6/2020 |
| WO | 2019116973 | A1 | 6/2019 |
| WO | 2019142180 | A1 | 7/2019 |

OTHER PUBLICATIONS

Grimm, Daniel; Leiner, Simon; Sommer, Martin; Pistorius, Felix; Sax, Eric; "Flow-based Aggregation of CAN Frames with Compressed Payload," International Conference on Smart Computing (SMARTCOMP), Bologna, Italy, Sep. 14-17, 2020, IEEE, pp. 202-207.*

* cited by examiner

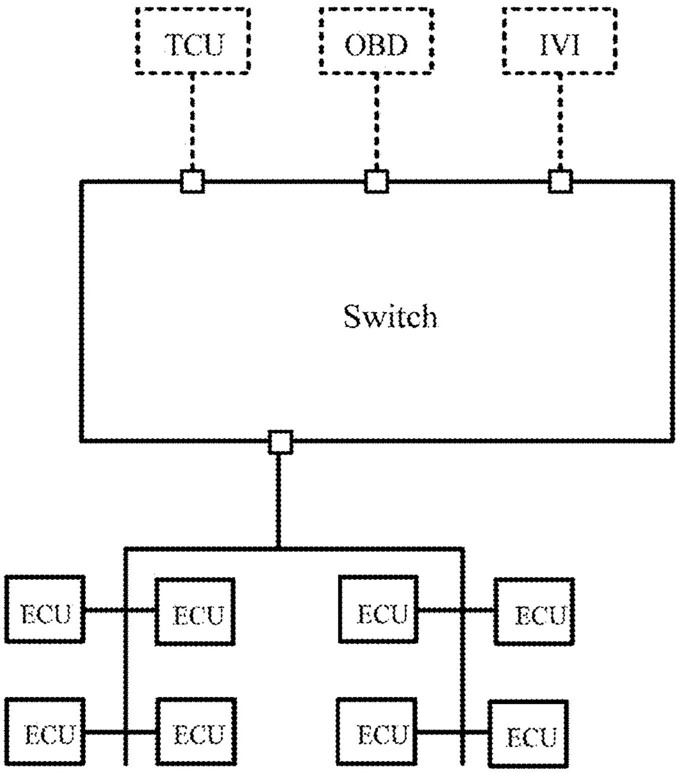
Prior Art FIG. 1
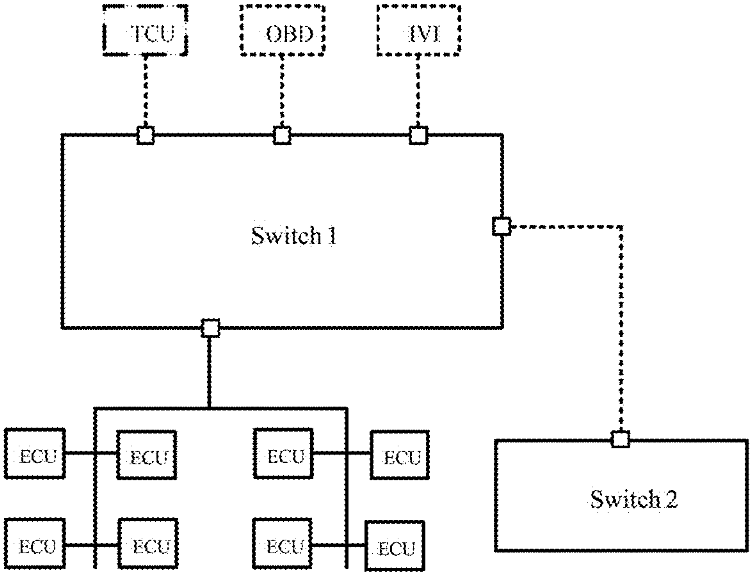
Prior Art FIG. 2

INTRUSION MONITORING SYSTEM, METHOD AND RELATED PRODUCTS

CROSS-REFERENCE TO RELATED APPLICATION

This application is a continuation of International Application No. PCT/CN2020/116322, filed on Sep. 18, 2020, the disclosure of which is hereby incorporated by reference in its entirety.

TECHNICAL FIELD

The present disclosure relates to the technical field of automatic vehicle technologies, and in particular, to an intrusion monitoring system, an intrusion monitoring method and related products.

BACKGROUND

The number and types of electronic devices in a vehicle are increasing day by day. Modern cars may support different kinds of bus technologies, such as the controller area network (CAN) bus technology, the Ethernet technology, etc. The modern cars will have several controller area network (CAN) electronic control units (ECUs) as well as Ethernet devices connected to the CAN and Ethernet ports of a switch, respectively. An ECU may also be referred to as an on-board computer, which is generally responsible for the normal operation of a modern car. An Ethernet device may be, for example, a telecommunication unit (TCU), an on-board diagnostics (OBD), an in-vehicle infotainment (IVI) or the like.

FIG. 1 is a schematic structural diagram of a switch in related art. As shown in FIG. 1, CAN connections, including connections between the ECUs and connections among the ECUs and the switch, are shown in solid lines; Ethernet connections, including connections between the Ethernet devices and connections among the Ethernet devices and the switch, are shown in dotted lines. The CAN ECUs connected with each other via a CAN bus form the CAN where communication among the CAN ECUs takes place via CAN frames. Hence, data traffic inside the CAN is included of CAN frames. The Ethernet devices connected to the port of the switch form Ethernet network where communication among the Ethernet devices takes place through internet protocol (IP) packets. Hence, the data traffic inside the Ethernet network is included of the IP packets.

Modern cars may have more than one switch connected to each other via Ethernet cables. Each switch may have different CAN ECUs and Ethernet devices connected thereto. It is also possible that no Ethernet devices or CAN ECUs is connected to a switch. As shown in FIG. 2, the CAN connections and the Ethernet connections are denoted in the same way as in FIG. 1*a*, the Ethernet devices and the CAN ECUs may be connected to different switches, depending on their own functions. For example, the TCU port, OBD port, and IVI port may be part of a switch at the front of the modern car whereas a charging port may be at a switch at the rear of the modern car.

This background information is provided to reveal information believed by the applicant to be of possible relevance to the present disclosure. No admission is necessarily intended, nor should be construed, that any of the preceding information constitutes prior art against the present disclosure.

SUMMARY

Embodiments of the present disclosure provide an intrusion monitoring system, an intrusion monitoring method and related products.

The foregoing and other objects are achieved by the subject matter of the independent claims. Further implementation forms are apparent from the dependent claims, the description and the figures.

A first aspect the present disclosure relates to an intrusion monitoring system, including: a first monitoring component deployed in a first network, a second monitoring component deployed in a second network, and a first control component; both of the first monitoring component and the second monitoring component are connected to the first control component; the first monitoring component is configured to obtain first reporting information on data traffic in the system and transmit the first reporting information to the first control component, where data traffic in the system is from the first network to the second network; the second monitoring component is configured to obtain second reporting information on the data traffic and transmit the second reporting information to the first control component; and the first control component is configured to receive the first reporting information from the first monitoring component and the second reporting information from the second monitoring component, and determine whether the data traffic is an attack according to the first reporting information and the second reporting information.

According to the embodiment of the present disclosure, the first monitoring component obtains first reporting information on data traffic in the system and transmits the first reporting information to the first control component, the second monitoring component is configured to obtain second reporting information on the data traffic and transmits the second reporting information to the first control component, the first control component receives the first reporting information from the first monitoring component and the second reporting information from the second monitoring component, and determines whether the data traffic is an attack according to the first reporting information and the second reporting information. Thanks to the hierarchical structure formed by the first monitoring component, the second monitoring component and the first control component, the first monitoring component and the second monitoring component obtain first reporting information and second reporting information respectively, and the first control component makes determination on whether the data traffic is an attack based on the first reporting information obtained by the first monitoring component and the second reporting information obtained by the second monitoring component, thereby linking the two components together by performing a global analysis on the received reporting information, hence rendering it possible to monitor the traffic passing from one network to another network, such as the CAN over IP traffic or the IP over CAN traffic.

Regarding the manner in which the first reporting information is obtained, in a possible implementation, the first reporting information may be obtained in a direct manner, e.g., generated by the first monitoring component according to the data traffic passing thereby. In another possible implementation, the first monitoring component may obtain the first reporting information in an indirect manner, for example, the first monitoring component may generate the first reporting information by analyzing information reported by other components. Both of the above manners will be elaborated in detail in the detailed description of the embodiments. The same principles also apply for the manner of obtaining the second reporting information.

In a possible implementation form of the system according to the first aspect as such, the intrusion monitoring system includes a vehicle.

In a possible implementation form of the system according to the first aspect as such, the first monitoring component, the second monitoring component and the first control component are all in the same switch. In this case, the intrusion detection system may be actually realized as a system inside a particular device, that is, the first monitoring component, the second monitoring component and the first control component may be implemented inside one device.

In a possible implementation form of the system according to the first aspect as such, the first monitoring component is configured to process the data traffic in the first network to generate the first reporting information, transmit the first reporting information to the first control component, and the processed data traffic then goes to the second network; the second monitoring component in the second network is configured to receive the data traffic processed by the first monitoring component, process the processed data traffic to generate second reporting information and transmit the second reporting information to the first control component; and the first control component is configured to receive the first reporting information from the first monitoring component and the second reporting information from the second monitoring component, and determine whether the data traffic is an attack according to the first reporting information and the second reporting information.

According to the embodiment of the present disclosure, the first control component receives reporting information from both of the monitoring components, thereby linking the two components together by performing a global analysis on the received reporting information, hence rendering it possible to monitor the traffic passing from one network to another network, such as the CAN over IP traffic or the IP over CAN traffic.

In a possible implementation form of the system according to the first aspect or any implementation thereof, where the first monitoring component includes an intrusion detection system IDS and is deployed on a first switching component.

In a possible implementation form of the system according to the first aspect or any implementation thereof, where the second monitoring component includes an intrusion detection system IDS and is deployed on a second switching component.

In a possible implementation form of the system according to the first aspect or any implementation thereof, where the first monitoring component includes a first switching component and a first detection device including an intrusion detection system IDS, the first switching component is connected to the first detection device, the first detection device is connected to the first control component; the first detection device is configured to generate the first reporting information and the first switching component is configured to process the data traffic. In fact, the first monitoring component is implemented as two devices, one of which may be implemented as a gateway responsible for processing the data traffic, and the other one may be a device connected to the gateway and responsible for generating the first reporting information.

In a possible implementation form of the system according to the first aspect or any implementation thereof, where the second monitoring component includes a second switching component and a second detection device deployed with an intrusion detection system IDS, the second switching component is connected to the second detection device, and the second detection device is connected to the first monitoring component; the second detection device is configured to generate the second reporting information and the second switching component is configured to process the processed data traffic. In fact, the second monitoring component is implemented as two devices, one of which may be implemented as a message converter responsible for processing the data traffic, and the other one may be a device connected to the message converter and responsible for generating the second reporting information.

In a possible implementation form of the system according to the first aspect or any implementation thereof, where the first monitoring component and the second monitoring component are deployed in the same switch.

In a possible implementation form of the system according to the first aspect or any implementation thereof, where the first control component includes an intrusion detection system IDS and is deployed inside the switch separated from the first monitoring component and the second monitoring component.

In a possible implementation form of the system according to the first aspect or any implementation thereof, where the first control component includes an intrusion detection system IDS and is deployed outside the switch.

In a possible implementation form of the system according to the first aspect or any implementation thereof, where the first monitoring component includes an intrusion detection system IDS and is deployed in a first switch, the second monitoring component includes an IDS and is deployed in a second switch, and the first control component includes an intrusion detection system IDS and is deployed outside the first switch and the second switch.

In a possible implementation form of the system according to the first aspect or any implementation thereof, where the first control component is further configured to monitor a working status of the first monitoring component and a working status of the second monitoring component.

In a possible implementation form of the system according to the first aspect or any implementation thereof, where the first monitoring component is connected to the first control component via a first-type connection and the second monitoring component is connected to the first control component via a second-type connection.

In a possible implementation form of the system according to the first aspect as such, the intrusion monitoring system further includes a third monitoring component connected to the first monitoring component; where the first monitoring component is deployed in a first switch, the third monitoring component is deployed in a second switch; where the third monitoring component is configured to generate third reporting information and transmit the third reporting information to the first monitoring component; and the first monitoring component is configured to obtain the first reporting information according to the third reporting information and transmit the first reporting information to the first control component.

According to the embodiment of the present disclosure, the third monitoring component, the first monitoring component and the first control component form a hierarchical structure, where the first monitoring component analyzes the information reported by the third monitoring component, and the first control component further analyzes the information reported by the first monitoring component, thereby rendering it possible to detect the advanced attacks within its respective network which individual third monitoring components within that network will not be able to detect, thus improving the accuracy of the intrusion detection.

In a possible implementation form of the system according to the first aspect or any implementation thereof, the system further includes a fourth monitoring component connected to the second monitoring component and deployed in the second network; where the second monitoring component is deployed in the first switch, and the fourth monitoring component is deployed in the second switch; where the fourth monitoring component is configured to generate fourth reporting information and transmit the fourth reporting information to the first monitoring component; and the second monitoring component is configured to obtain the second reporting information according to the fourth reporting information and transmit the second reporting information to the first control component.

In a possible implementation form of the system according to the first aspect or any implementation thereof, where the second monitoring component is further configured to monitor a working status of the fourth monitoring component.

In a possible implementation form of the system according to the first aspect or any implementation thereof, where the second monitoring component includes an intrusion detection system IDS, and the fourth monitoring component includes an IDS.

In a possible implementation form of the system according to the first aspect or any implementation thereof, where the first control component is further configured to monitor a working status of the first monitoring component, and the first monitoring component is further configured to monitor a working status of the third monitoring component.

In a possible implementation form of the system according to the first aspect or any implementation thereof, where the first monitoring component includes an intrusion detection system IDS, the third monitoring component includes an IDS and the first control component includes an IDS.

In a possible implementation form of the system according to the first aspect or any implementation thereof, where the first control component is deployed at any one of the following positions: inside the first switch, inside the second switch, or outside the first switch and the second switch.

In a possible implementation form of the system according to the first aspect as such, the intrusion monitoring system further includes a second control component connected to the first control component; where the first control component is configured to analyze the first reporting information and the second reporting information to generate combined reporting information, and determine whether the data traffic is an attack according to the combined reporting information; the first control component is further configured to transmit the combined reporting information to the second control component; and the second control component is configured to receive combined reporting information from the first control component and analyze the combined reporting information.

The combined reporting information generated by the first control component is transmitted to the second control component which has more abundant information on attacks, thus further improving the accuracy of the intrusion detection.

In a possible implementation form of the system according to the first aspect or any implementation thereof, where the first control component is configured to transmit the combined reporting information to the second control component in response to determining that the data traffic is not an attack; and the second control component is configured to analyze the combined reporting information and reporting information from other vehicles to determine whether the data traffic is a new attack.

In a possible implementation form of the system according to the first aspect or any implementation thereof, where the second control component is further configured to monitor a working status of the first control component.

In a possible implementation form of the system according to the first aspect or any implementation thereof, where the second control component is further configured to generate an alert in response to determining that the data traffic is a new attack.

In a possible implementation form of the system according to the first aspect or any implementation thereof, where the second control component is further configured to, in response to determining that the data traffic is a new attack, notify the first control component of update data, where the update data indicates a strategy for handling a new attack; the first control component is further configured to perform an update operation according to the update data.

In a possible implementation form of the system according to the first aspect or any implementation thereof, where the first control component is further configured to notify the first monitoring component and the second monitoring component of update data, where the update data indicates a strategy for handling a new attack; the first monitoring component is further configured to perform an update operation according to the update data, and the second monitoring component is further configured to perform the update operation according to the update data.

In a possible implementation form of the system according to the first aspect or any implementation thereof, where the update operation includes one or more of the following operations: update of an intrusion detection rule; update of an intrusion signature; update of an intrusion detection algorithm; or, notification of a newly trained model to detect the new attack.

In a possible implementation form of the system according to the first aspect or any implementation thereof, where the first control component is further configured to perform a preventive operation in response to determining that the data traffic is an attack.

In a possible implementation form of the system according to the first aspect or any implementation thereof, where the preventive operation includes any one or more of following operations: logging of the attack; notification of the attack; initiation of a safe vehicle state process to bring the vehicle into a safe state; or, blocking of the attack.

In a possible implementation form of the system according to the first aspect or any implementation thereof, where the first monitoring component is a controller area network CAN intrusion detection system IDS component and the second network is an Ethernet IDS component; or, the first monitoring component is an Ethernet IDS component and the second monitoring component is a CAN IDS component.

In a possible implementation form of the system according to the first aspect or any implementation thereof, where the first network is a controller area network CAN, and the second network is an Ethernet.

A second aspect of the present disclosure relates to an intrusion monitoring method, including:

receiving, by a first control component, first reporting information on data traffic from a first monitoring component, where the data traffic is from a first network, where the first monitoring component is deployed, to a second network; receiving, by the first control component, second reporting information on the data traffic from a second monitoring component, where the second monitoring component is deployed in the second network; and determining, by the first control component, whether data traffic in the system is an attack according to the first reporting information and the second reporting information.

In a possible implementation form of the intrusion monitoring method according to the second aspect or any implementation thereof, where the first reporting information is obtained according to third reporting information transmitted from a third monitoring component to the first monitoring component.

In a possible implementation form of the intrusion monitoring method according to the second aspect or any implementation thereof, where the second reporting information is obtained according to fourth reporting information transmitted from a fourth monitoring component to the second monitoring component.

In a possible implementation form of the intrusion monitoring method according to the second aspect or any implementation thereof, where the determining, by the first control component, whether data traffic is an attack according to the first reporting information and the second reporting information includes: analyzing, by the first control component, the first reporting information from the first monitoring component and the second reporting information from the second monitoring component to generate combined reporting information; and determining, by the first control component, whether the data traffic is an attack according to the combined reporting information.

In a possible implementation form of the intrusion monitoring method according to the second aspect or any implementation thereof, the method further includes: transmitting, by the first control component, the combined reporting information to a second control component in response to determining that the data traffic is not an attack; receiving, by the first control component, update data from the second control component, where the update data indicates a strategy for handling a new attack; performing, by the first control component, an update operation according to the update data; and transmitting, by the first control component, the update data to the first monitoring component and the second monitoring component.

In a possible implementation form of the intrusion monitoring method according to the second aspect or any implementation thereof, where the update operation includes one or more of the following operations: update of an intrusion detection rule; update of an intrusion signature; update of an intrusion detection algorithm; or, notification of a newly trained model to detect the new attack.

In a possible implementation form of the intrusion monitoring method according to the second aspect or any implementation thereof, the method further includes: performing, by the first control component, a preventive operation in response to determining that the data traffic is an attack.

In a possible implementation form of the intrusion monitoring method according to the second aspect or any implementation thereof, where the preventive operation includes any one or more of following operations: logging of the attack; notification of the attack; initiation of a safe vehicle state process to bring the vehicle into a safe state; or, blocking of the attack.

In a possible implementation form of the intrusion monitoring method according to the second aspect or any implementation thereof, where the first monitoring component is a controller area network CAN intrusion detection system IDS component and the second monitoring component is an Ethernet IDS component; or, the first monitoring component is an Ethernet IDS component and the second monitoring component is a CAN IDS component.

A third aspect of the present disclosure relates to an intrusion monitoring method, including: receiving, by a second control component, combined reporting information from a first control component, where the combined reporting information is obtained by the first control component through analyzing first reporting information on data traffic from a first monitoring component and second reporting information on the data traffic from a second monitoring component, where the data traffic is from a first network where the first monitoring component is deployed to a second network where the second monitoring component is deployed; and analyzing, by the second control component, the combined reporting information.

In a possible implementation form of the intrusion monitoring method according to the third aspect or any implementation thereof, where the combined reporting information is obtained by the first control component on determining that the data traffic is not an attack; the analyzing, by the second control component, the combined reporting information includes: analyzing, by the second control component, the combined reporting information and reporting information from other vehicles to determine whether the data traffic is a new attack.

In a possible implementation form of the intrusion monitoring method according to the third aspect or any implementation thereof, the method further includes: notifying, by the second control component, the first control component of update data in response to determining that the data traffic is a new attack, where the update data indicates a strategy for handling a new attack.

A fourth aspect of the present disclosure relates to an intrusion monitoring method, including: obtaining, by a first monitoring component, first reporting information on data traffic from a first network where the first monitoring component is deployed to a second network; and transmitting, by the first monitoring component, the first reporting information to the first control component.

In a possible implementation form of the intrusion monitoring method according to the fourth aspect or any implementation thereof, where the obtaining, by a first monitoring component, first reporting information on data traffic from a first network where the first monitoring component is deployed to a second network includes: receiving, by the first monitoring component, third reporting information from a third monitoring component; and analyzing, by the first monitoring component, the third reporting information from the third monitoring component to generate the first reporting information.

In a possible implementation form of the intrusion monitoring method according to the fourth aspect or any implementation thereof, the method further includes: receiving, by the first monitoring component, update data from the first control component, where the update data indicates a strategy for handling a new attack; and performing, by the first monitoring component, an update operation according to the update data.

In a possible implementation form of the intrusion monitoring method according to the fourth aspect or any implementation thereof, the method further includes:

transmitting, by the first monitoring component, the update data to the third monitoring component.

A fifth aspect of the present disclosure relates to a first control component, configured to perform the method in the above-mentioned second aspect or any possible implementation of the second aspect.

A sixth aspect of the present disclosure relates to a second control component, configured to perform the method in the above-mentioned third aspect or any possible implementation of the third aspect.

A seventh aspect of the present disclosure relates to a first monitoring component, configured to perform the method in the above-mentioned fourth aspect or any possible implementation of the fourth aspect.

An eight aspect of the present disclosure relates to a first control component, including a memory, a processor, an input interface, and an output interface. The memory, the processor, the input interface, and the output interface are connected by a bus system. The memory is configured to store an instruction, and the processor is configured to execute the instruction stored in the memory for performing the method in the above-mentioned second aspect or any possible implementation of the second aspect.

A ninth aspect of the present disclosure relates to a second control component, including a memory, a processor, an input interface, and an output interface. The memory, the processor, the input interface, and the output interface are connected by a bus system. The memory is configured to store an instruction, and the processor is configured to execute the instruction stored in the memory for performing the method in the above-mentioned third aspect or any possible implementation of the third aspect.

A tenth aspect of the present disclosure relates to a first monitoring component, including a memory, a processor, an input interface, and an output interface. The memory, the processor, the input interface, and the output interface are connected by a bus system. The memory is configured to store an instruction, and the processor is configured to execute the instruction stored in the memory for performing the method in the above-mentioned fourth aspect or any possible implementation of the fourth aspect.

An eleventh aspect of the present disclosure relates to a computer storage medium storing computer executable instructions which, when being executed, implement the method in the above-mentioned second, third and fourth aspects or any possible implementation thereof.

A twelfth aspect of the present disclosure relates to a vehicle, including an intrusion monitoring system according to the above-mentioned first aspect or any possible implementation of the first aspect.

A thirteenth aspect of the present disclosure relates to a computer program product is provided, including an instruction which, when executed on a computer, causes a computer to perform the method in the above-mentioned embodiments.

A fourteenth aspect of the present disclosure relates to an intrusion monitoring system, including: a first monitoring component deployed in a controller area network CAN, a second monitoring component deployed in an Ethernet network, and a first control component; both of the first monitoring component and the second monitoring component are connected to the first control component; the first monitoring component is configured to obtain first CAN reporting information on data traffic in the system and transmit the first CAN reporting information to the first control component, where the data traffic in the system is from the CAN to the Ethernet network or from the Ethernet network to the CAN; the second monitoring component is configured to obtain second Ethernet reporting information on the data traffic and transmit the second Ethernet reporting information to the first control component; and the first control component is configured to receive the first CAN reporting information from the first monitoring component and the second Ethernet reporting information from the second monitoring component, and determine whether the data traffic is an attack according to the first CAN reporting information and the second Ethernet reporting information.

Regarding the manner in which the first CAN reporting information is obtained, in an implementation, the first CAN reporting information may be obtained in a direct manner, e.g., generated by the first monitoring component according to the data traffic passing thereby. In another possible implementation, the first monitoring component may obtain the first CAN reporting information in an indirect manner, for example, the first monitoring component may generate the first CAN reporting information by analyzing information reported by other components. The same principles also apply for the manner of obtaining the second reporting information.

Regarding the implementation of the first monitoring component, it may be implemented as a software component deployed on the switch, e.g., on the gateway (e.g., a CAN/IP gateway); or the first monitoring component may be implemented as a network intrusion detection system (NIDS) device inside the switch connected to the gateway so that it can receive CAN traffic; or, the first monitoring component may be implemented as a NIDS device attached to the outer port of the switch. It should be understood that the first monitoring component may be any other device as far as it completes the functions described above.

Regarding the implementation of the second monitoring component, it may be implemented as a software component deployed on the switch, e.g., on the message converter (e.g., a CAN/IP message converter); or the second monitoring component may be implemented as a network intrusion detection system (NIDS) device inside the switch connected to the message converter so that it can receive Ethernet traffic; or, the second monitoring component may be implemented as a NIDS device attached to the outer port of the switch. It should be understood that the second monitoring component may be any other device as far as it completes the functions described above.

Regarding the implementation of the first control component, it may be implemented as a software component deployed inside a switch which includes the first monitoring component and the second monitoring component; or it may be implemented as a dedicated hardware device attached to the outer port of the switch or inside the switch; or it may be implemented as a software or hardware deployed on any domain controller device connected to the switch.

In a possible implementation form of the intrusion monitoring system according to the fourteenth aspect, where the data traffic in the system is from the CAN to the Ethernet network; the first monitoring component is configured to process the data traffic to generate first CAN reporting information, transmit the first CAN reporting information to the first control component, and pass the processed data traffic to the second monitoring component; the second monitoring component is configured to receive the processed data traffic from the first monitoring network, process the processed data traffic to generate the second Ethernet reporting information and transmit the second Ethernet reporting information to the first control component; and the first control component is configured to receive the first CAN reporting information from the first monitoring component and the second Ethernet reporting information from the second monitoring component, and determine whether the data traffic is an attack according to the first CAN reporting information and the second Ethernet reporting information.

In a possible implementation form of the intrusion monitoring system according to the fourteenth aspect, where the data traffic in the system is from the Ethernet network to the CAN; the second monitoring component is configured to process the data traffic to generate second Ethernet reporting information, and transmit the second Ethernet reporting information to the first control component and pass the processed data traffic to the first monitoring component; the first monitoring component is configured to receive the processed data traffic from the second monitoring network, process the processed data traffic to generate the first CAN reporting information and transmit the first CAN reporting information to the first control component; and the first control component is configured to receive the first CAN reporting information from the first monitoring component and the second Ethernet reporting information from the second monitoring component, and determine whether the data traffic is an attack according to the first CAN reporting information and the second Ethernet reporting information.

In a possible implementation form of the intrusion monitoring system according to the fourteenth aspect or any implementation thereof, where the first monitoring component and the second monitoring component are deployed in a same switch, the first control component includes an intrusion detection system IDS and is deployed inside the switch separated from the first monitoring component and the second monitoring component.

In a possible implementation form of the intrusion monitoring system according to the fourteenth aspect or any implementation thereof, where the first control component is further configured to monitor a working status of the first monitoring component and a working status of the second monitoring component.

In a possible implementation form of the intrusion monitoring system according to the fourteenth aspect or any implementation thereof, the system further includes a third monitoring component connected to the first monitoring component and deployed in the CAN; where the first monitoring component is deployed in a first switch, and the third monitoring component is deployed in a second switch; where the third monitoring component is configured to generate third CAN reporting information and transmit the third CAN reporting information to the first monitoring component; and the first monitoring component is configured to obtain the first CAN reporting information according to the third CAN reporting information and transmit the first CAN reporting information to the first control component.

In a possible implementation form of the intrusion monitoring system according to the fourteenth aspect or any implementation thereof, where the first control component is further configured to monitor a working status of the first monitoring component, and the first monitoring component is further configured to monitor a working status of the third monitoring component.

In a possible implementation form of the intrusion monitoring system according to the fourteenth aspect or any implementation thereof, the system further includes a fourth monitoring component connected to the second monitoring component and deployed in the Ethernet network; where the second monitoring component is deployed in the first switch, and the fourth monitoring component is deployed in the second switch; where the fourth monitoring component is configured to generate fourth Ethernet reporting information and transmit the fourth Ethernet reporting information to the first monitoring component; and the second monitoring component is configured to obtain the second Ethernet reporting information according to the fourth Ethernet reporting information and transmit the second Ethernet reporting information to the first control component.

In a possible implementation form of the intrusion monitoring system according to the fourteenth aspect or any implementation thereof, where the first control component is further configured to monitor a working status of the second monitoring component, and the second monitoring component is further configured to monitor a working status of the fourth monitoring component.

In a possible implementation form of the intrusion monitoring system according to the fourteenth aspect or any implementation thereof, where the first control component is further configured to notify the first monitoring component and the second monitoring component of update data, where the update data indicates a strategy for handling a new attack; the first monitoring component is further configured to receive the update data from the first control component and perform an update operation according to the update data, and the second monitoring component is further configured to receive the update data from the first control component and perform the update operation according to the update data.

In a possible implementation form of the intrusion monitoring system according to the fourteenth aspect or any implementation thereof, where the first control component is further configured to perform a preventive operation in response to determining that the data traffic is an attack.

In a possible implementation form of the intrusion monitoring system according to the fourteenth aspect or any implementation thereof, where the preventive operation includes any one or more of following operations: logging of the attack; notification of the attack; initiation of a safe vehicle state process to bring the vehicle into a safe state; or, blocking of the attack.

A fifteenth aspect of the present disclosure relates to an intrusion monitoring method, applied to an intrusion monitoring system including a first monitoring component deployed in a controller area network CAN, a second monitoring component deployed in an Ethernet network, and a first control component; both of the first monitoring component and the second monitoring component are connected to the first control component, where the method includes: obtaining and transmitting, by the first monitoring component, first CAN reporting information on data traffic in the system to the first control component, where the data traffic in the system is from the CAN to the Ethernet network or from the Ethernet network to the CAN; obtaining and transmitting, by the second monitoring component, second Ethernet reporting information on the data traffic to the first control component; and receiving, by the first control component, the first CAN reporting information from the first monitoring component and the second Ethernet reporting information from the second monitoring component, and determining, by the first control component, whether the data traffic is an attack according to the first CAN reporting information and the second Ethernet reporting information.

In a possible implementation form of the intrusion monitoring method according to the fifteenth aspect, where the data traffic in the system is from the CAN to the Ethernet network; the method includes: processing, by the first monitoring component, the data traffic to generate first CAN reporting information; transmitting, by the first monitoring component, the first CAN reporting information to the first control component, and passing, by the first monitoring component, the processed data traffic to the second monitoring component; receiving, by the second monitoring component, the processed data traffic from the first monitoring network; processing, by the second monitoring component, the processed data traffic to generate the second Ethernet reporting information; transmitting, by the second monitoring component, the second Ethernet reporting information to the first control component; receiving, by the first control component, the first CAN reporting information from the first monitoring component and the second Ethernet reporting information from the second monitoring component; and determining, by the first control component, whether the data traffic is an attack according to the first CAN reporting information and the second Ethernet reporting information.

In a possible implementation form of the intrusion monitoring method according to the fifteenth aspect, where the data traffic in the system is from the Ethernet network to the CAN; the method includes: processing, by the second monitoring component, the data traffic to generate second Ethernet reporting information; transmitting, by the second monitoring component, the second Ethernet reporting information to the first control component and passing, by the second monitoring component, the processed data traffic to the first monitoring component; receiving, by the first monitoring component, the processed data traffic from the second monitoring network; processing, by the first monitoring component, the processed data traffic to generate the first CAN reporting information; transmitting, by the first monitoring component, the first CAN reporting information to the first control component; receiving, by the first control component, the first CAN reporting information from the first monitoring component and the second Ethernet reporting information from the second monitoring component; and determining, by the first control component, whether the data traffic is an attack according to the first CAN reporting information and the second Ethernet reporting information.

In a possible implementation form of the intrusion monitoring method according to the fifteenth aspect or any implementation thereof, the method further includes: monitoring, by the first control component, a working status of the first monitoring component and a working status of the second monitoring component.

In a possible implementation form of the intrusion monitoring method according to the fifteenth aspect or any implementation thereof, the method further includes: generating, by a third monitoring component, third CAN reporting information, where the third monitoring component is connected to the first monitoring component and deployed in the CAN, the first monitoring component is deployed in a first switch, and the third monitoring component is deployed in a second switch; transmitting, by the third monitoring component, the third CAN reporting information to the first monitoring component; obtaining, by the first monitoring component, the first CAN reporting information according to the third CAN reporting information; and transmitting, by the first monitoring component, the first CAN reporting information to the first control component.

In a possible implementation form of the intrusion monitoring method according to the fifteenth aspect or any implementation thereof, the method further includes: monitoring, by the first control component, a working status of the first monitoring component, and monitoring, by the first monitoring component, a working status of the third monitoring component.

In a possible implementation form of the intrusion monitoring method according to the fifteenth aspect or any implementation thereof, the method further includes: generating, by a fourth monitoring component, fourth Ethernet reporting information, where the fourth monitoring component is connected to the second monitoring component and deployed in the Ethernet network, the second monitoring component is deployed in the first switch, and the fourth monitoring component is deployed in the second switch; transmitting, by the fourth monitoring component, the fourth Ethernet reporting information to the first monitoring component; obtaining, by the second monitoring component, the second Ethernet reporting information according to the fourth Ethernet reporting information; transmitting, by the second monitoring component, the second Ethernet reporting information to the first control component.

In a possible implementation form of the intrusion monitoring method according to the fifteenth aspect or any implementation thereof, the method further includes: monitoring, by the first control component, a working status of the second monitoring component, and monitoring, by the second monitoring component, a working status of the fourth monitoring component.

In a possible implementation form of the intrusion monitoring method according to the fifteenth aspect or any implementation thereof, the method further includes: notifying, by the first control component, the first monitoring component and the second monitoring component of update data, where the update data indicates a strategy for handling a new attack; receiving, by the first monitoring component, the update data from the first control component and performing, by the first monitoring component, an update operation according to the update data; and receiving, by the second monitoring component, the update data from the first control component and performing, by the second monitoring component, an update operation according to the update data.

In a possible implementation form of the intrusion monitoring method according to the fifteenth aspect or any implementation thereof, the method further includes: performing, by the first control component, a preventive operation in response to determining that the data traffic is an attack.

A sixteenth aspect of the present disclosure relates to an intrusion monitoring system, including a first monitoring component deployed in a controller area network CAN, a second monitoring component deployed in an Ethernet network, and a first control component; both of the first monitoring component and the second monitoring component are connected to the first control component; the first monitoring component includes a first processor and a first memory for storing a first computer program capable of running on the first processor, where when the first computer program is run, the first processor is configured to execute steps performed by the first monitoring component in the fifteenth aspect or any implementation thereof; the second monitoring component includes a second processor and a second memory for storing a second computer program capable of running on the second processor, where when the second computer program is run, the second processor is configured to execute steps performed by the second monitoring component in the fifteenth aspect or any implementation thereof; and the first control component includes a third processor and a third memory for storing a third computer program capable of running on the third processor, where when the third computer program is run, the third processor is configured to execute steps performed by the first control component in the fifteenth aspect or any implementation thereof.

In a possible implementation form of the intrusion monitoring method according to the sixteenth aspect, the third processor and the first processor are implemented as one processor. In this case, optionally, the third memory and the first memory may or may not be implemented as one memory.

In a possible implementation form of the intrusion monitoring method according to the sixteenth aspect, the third processor and the second processor are implemented as one processor. In this case, optionally, the third memory and the second memory may or may not be implemented as one memory.

In a possible implementation form of the intrusion monitoring method according to the sixteenth aspect, the first processor, the second processor and the third processor are implemented as one processor. In this case, optionally, first memory, the second memory and the third memory may or may not be implemented as one memory.

BRIEF DESCRIPTION OF DRAWINGS

FIG. 1 is a schematic structural diagram of a switch in related art;

FIG. 2 is a schematic structural diagram of another switch in related art;

DESCRIPTION OF EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and include structural or logical changes not depicted in the figures. The following detailed description, therefore, is not to be taken in a limiting sense, and the scope of the present disclosure is defined by the appended claims.

Several terms that may be used herein are briefly explained before elaborating the present disclosure.

A user device, which may also be referred to as a terminal device, a terminal station or user equipment, may be any one of the following devices: a smartphone, a mobile phone, a cellular phone, a cordless phone, a session initiation protocol (SIP) phone, a wireless local loop (WLL) station, a personal digital assistant (PDA), a handheld device capable of wireless communication, an on-board equipment, a wearable device, a computing device or other processing devices connecting to a wireless modem.

A switch here may indicate any intelligent device providing switching and other functionalities in an in-vehicle network, e.g., a gateway device in current in-vehicle network or any other such device having a different proprietary name and similar functionalities. The examples of Ethernet devices, also known as external communication components, include TCU (Telecommunication Unit), OBD (On-Board Diagnostic) Tool, IVI (In-Vehicle Infotainment), and any other such Ethernet device.

As described in related art, the ECUs in the CAN are connected via the CAN bus to the switch, and the Ethernet devices in the Ethernet are connected via the Ethernet to the switch. There may be different kinds of traffic passing through the switch, including CAN to CAN traffic, IP to IP traffic, CAN to IP traffic and IP to CAN traffic. The CAN to CAN traffic refers to traffic from an ECU in a CAN to another CAN ECU, and the IP to IP traffic refers to traffic from an Ethernet device to another Ethernet device.

Other than CAN to CAN traffic inside the CAN network and IP to IP traffic inside the Ethernet network, there are messages exchanged across the networks:

a) From Ethernet to CAN (i.e., IP over CAN traffic), example of such communication is a diagnostics message/command sent from OBD port to a CAN ECU.

b) From CAN to Ethernet (i.e., CAN over IP traffic), example of such communication is a message sent from a CAN ECU to IVI for displaying some information, e.g., charging status, fuel level etc.

c) From one Switch to another Switch. Example of such communication is a message sent from TCU (connected to switch 1) which goes to a CAN ECU (connected to the Switch 2), e.g., to open the car trunk.

Figure 3:
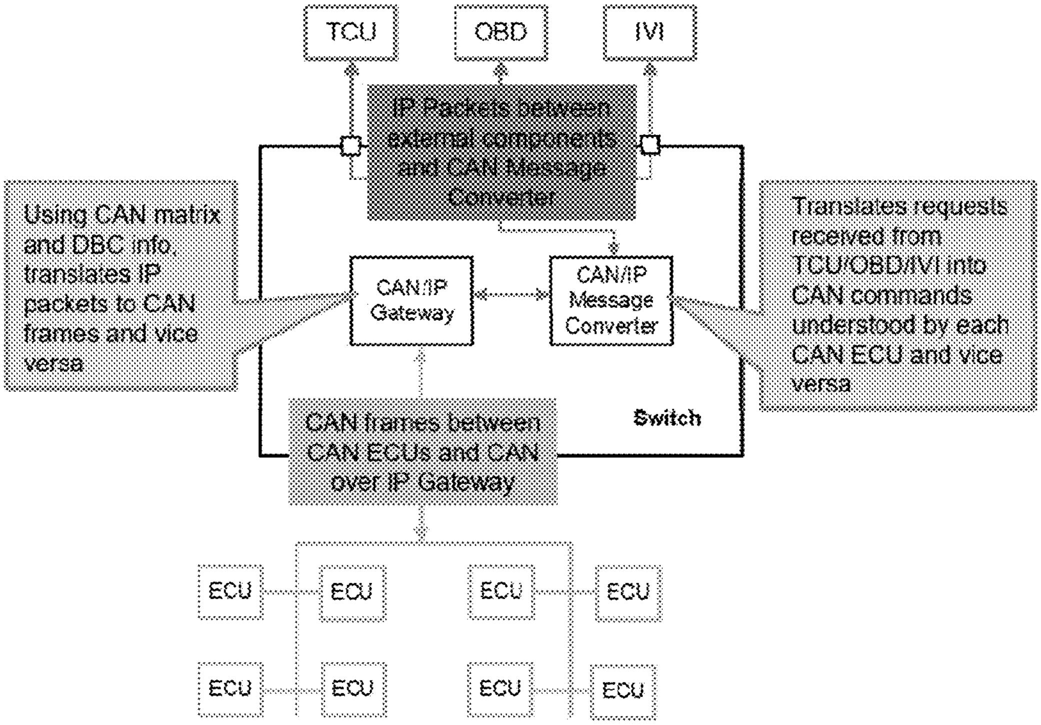
FIG. 3 is a schematic structural diagram of a switch with functional components.

The intelligent switches (gateways), thus, do not only route these messages but also perform additional tasks like CAN frame to IP packet translation and vice versa. For this purpose, they have dedicated components inside the switches. For example, as shown in FIG. 3, a diagnostics message received at an OBD port, which is destined to a CAN ECU, is an IP packet. It first goes to the CAN/IP Message Converter inside the switch. The CAN/IP Message Converter translates the diagnostics request received from the OBD Tool connected at OBD port into a CAN command which is understandable by the CAN ECUs. CAN/IP Message Converter may be a dedicated hardware or a software component inside the switch gateway with any other proprietary name. The IP packet with translated CAN commands next goes to CAN/IP Gateway. The CAN/IP Gateway translates IP packet to a CAN frame. The translated CAN frame is then sent to the CAN (see FIG. 3). A CAN frame from CAN to IP network (also referred to as Ethernet) traverses in the opposite direction where the CAN frame is first translated to an IP packet by the CAN/IP Gateway and later the CAN command is translated to something understandable by the external communication components by the CAN/IP Message Converter.

The increase in the number of components installed in vehicles such as sensors, actuators, ECUs, communication systems etc., has changed a vehicle from closed to an open systems, thus increasing the attack surface for cyber-attacks in which attackers can access and influence vehicles from outside. Attacks on automotive are increasing day by day making it necessary to detect attacks on the vehicles as soon as possible. The standard 'ISO/SAE 21434 Road Vehicles—Cybersecurity Engineering' emphasizes on having a Cybersecurity Incident Response in a vehicle to handle cybersecurity events and respond to them. The regulation by UNECE WP.29 makes it mandatory to have the capability to analyze and detect cyber threats, vulnerabilities and cyber-attacks from the vehicle data and vehicle logs.

A system which is able to analyze, detect, and report such cyber-attacks in a communication network is known as a Network Intrusion Detection System (NIDS). However, the current automotive communication networks do not provide any such system by default to analyze, detect and report the cyber-attacks. Automotive communication networks do not have the ability to detect anomalies in the network traffic (e.g., a packet with a spoofed MAC address, a packet with the modified payload, a Denial of Service (DoS) attack etc.). More importantly, for a NIDS to be able to detect cyber-attacks more accurately and efficiently, it should be deployed in a vehicle at a place where it can monitor all the intended traffic going in or out of the vehicle so that it is able to detect all sorts of attacks, especially the attacks with long attack paths.

Previously, it was the CAN bus which was used for most of the communication inside the vehicle. So most of the communication was CAN traffic and only one type of IDS was enough to monitor that traffic, i.e., CAN IDS. However, now there is more than one bus technology inside the modern cars, i.e., CAN and Ethernet. A single IDS now, either CAN or Ethernet, may not monitor both CAN and IP traffic. CAN IDS is usually designed to analyze CAN frames and may not detect anomalies in Ethernet Packets whereas Ethernet IDS analyses IP Packets and cannot detect anomalies in CAN frames. Hence, it requires to have more than one IDS; one CAN IDS for CAN traffic analysis and another Ethernet IDS for IP traffic analysis.

Previously there was only one central gateway (switch) inside the vehicle where almost all the traffic used to go through the one gateway. It made IDS deployment choice easy, i.e., deploy IDS on the gateway which can monitor all the traffic for anomaly detection. However, now there are more than one switch inside a modern car. Multiple switches provide multiple paths for the traffic, making a single point for intrusion monitoring difficult.

Multiple bus technologies as well as multiple switches inside the modern vehicle make the design and deployment of CAN and Ethernet IDSs a challenging task for the modern vehicles. The intention behind this disclosure is the design and deployment strategy of IDS for CAN and Ethernet networks traffic for modern vehicle architecture to detect CAN, Ethernet, CAN Over IP as well as IP over CAN traffic attacks.

In sum, existing technical solutions for in-vehicle intrusion detection can be grouped into the following categories:

a) CAN IDS: there are several IDSs have been designed to monitor CAN traffic. These IDSs are able to detect attacks such as CAN ECU impersonation attacks, specification violation attacks, detection of payload anomalies, sequence context anomalies, and detection of message frequency anomalies in CAN traffic. They are able to analyze CAN frames using CAN IDs, CAN frame payload etc., to detect anomalies.

b) Ethernet IDS: there are only a few efforts have been seen in the design and development of an Ethernet IDS. An Ethernet IDS is able to monitor IP based traffic inside a vehicle (i.e., the IP packets generated by the automotive Ethernet protocols such as SOME/IP, DoIP, AVB/TSN etc.). The Ethernet IDS analyzes an IP packet using the packet source/destination addresses (both MAC and IP addresses) and ports, protocol types, etc.

A CAN IDS is able to detect anomalies in CAN to CAN traffic only and alone cannot analyze CAN over IP traffic. Similarly, an Ethernet IDS detects anomalies in IP to IP traffic only and alone cannot analyze IP over CAN traffic.

However, there may be several problems in existing solutions. Firstly, in-vehicle network combines different bus technologies which cannot be strictly separated and they influence each other. A CAN IDS is sufficient to analyze and detect anomalies in CAN frames, however, it cannot detect anomalies in IP packets which are analyzed based on source/destination addresses & ports, protocol types etc. Likewise, an Ethernet IDS is sufficient to analyze and detect anomalies in IP packets, however, it cannot analyze a CAN frame which requires the knowledge of CAN frame format.

As mentioned previously, other than CAN to CAN traffic inside CAN and IP to IP traffic inside Ethernet network, there are messages exchanged across the networks, i.e., from IP network to CAN (IP over CAN), CAN to IP network (CAN over IP).

An IP over CAN packet from external components (such as the OBD, TCU or IVI) detected as a normal packet by Ethernet IDS may be an intrusion detected by the CAN IDS based on the CAN frame data, CAN ID, and/or frequency. Likewise, a CAN over IP frame from CAN ECUs detected as normal by CAN IDS may be an attack detected by the Ethernet IDS based on MAC and/or IP addresses, ports etc.

Figure 4:
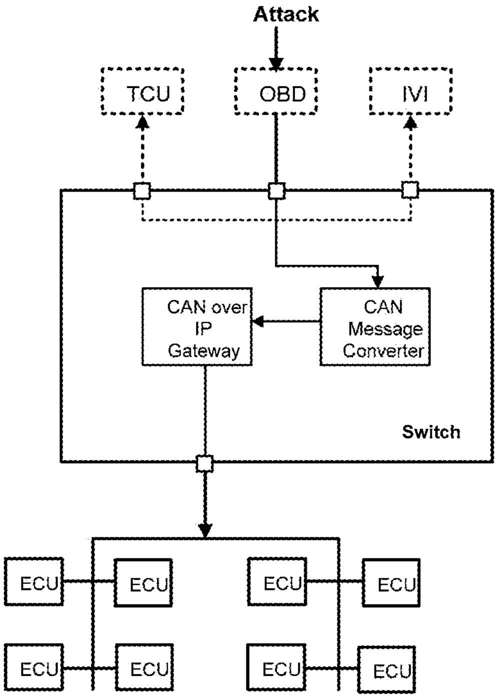
FIG. 4 is a schematic diagram showing a long path attack in a switch.

If both CAN and Ethernet IDS s work in isolation without any cooperation, they will not be able to detect attacks with the long paths (e.g., an attack traversing from IP to CAN shown in FIG. 4) or detect the complete attack path of such attacks. For example:

1. The same packet may be detected as a normal packet by an Ethernet IDS but later detected as an attack by a CAN IDS. For example, a diagnostics packet sent by the diagnostics Tester attached to the OBD port destined to a target CAN ECU. The Ethernet IDS will detect this as a normal packet based on IP headers since Tester is allowed to perform diagnostics for that CAN ECU. However, the CAN frame inspected by the CAN IDS may detect that the particular diagnostic function which the Tester is trying to run on the CAN ECU is not allowed on that CAN ECU or that particular Tester is not authorized to run that particular diagnostic function.

2. Likewise a same packet may be detected as an attack message by the Ethernet IDS whereas detected as a normal CAN frame by the CAN IDS. For example, a normal CAN message sent by the CAN ECU to an IVI system in order to display information such as fuel level may be modified on the way (by a compromised component) changing its destination from IVI to OBD port and will be detected as an attack by the Ethernet IDS in the absence of any ongoing diagnostics session.3 Similarly, since the Root IDS has complete context of both of the CAN network as well as the Ethernet network, and the complete path of each packet, using this additional information can also help Root IDS in detecting new attacks like Zero-Day attacks which may not be detected by both CAN and Ethernet IDSs working in isolation. Root IDS can be deployed on a powerful vehicle component with more computing/storage resources which enables it to use complex intrusion analysis techniques like Artificial Intelligence to detect those attacks which may not be detected by the lightweight techniques used by individual CAN and Ethernet IDSs. Moreover, an attack detected on CAN bus may indicate a possible attack on Ethernet network and vice versa. For example, DoS attack on CAN bus may indicate a possible DoS attack on Ethernet network. It again requires a collaboration between the two IDSs. Hence, CAN and Ethernet IDSs need to work collaboratively to detect attacks with long attack path and attacks on different networks. Another problem is the deployment of two IDSs in-vehicle networks such that they can access to all corresponding traffic, i.e., CAN IDS can monitor all the CAN traffic and Ethernet IDS can monitor all the IP traffic.

One possibility is to deploy both IDSs somewhere between external components (TCU, OBD, IVI) and the CAN/IP Message Converter shown in FIG. 3. However, a CAN IDS deployed at this point will not be able to see CAN frames and hence, will not able to detect CAN traffic anomalies. Second option is to deploy both IDSs somewhere between CAN and CAN/IP Gateway. However, the Ethernet IDS at this point will not be able to see IP frames and hence, will not be able to detect IP traffic anomalies. Hence, deployment of two IDS s inside the vehicle needs careful attention in order to be able to monitor CAN, Ethernet, CAN over IP, and IP over CAN traffic.

As described previously, the design and deployment of CAN and Ethernet IDSs inside a modern vehicle is a challenging task in the presence of multiple gateways and traffic going across the networks. The both IDSs should be deployed at such places where they can obtain their respective data traffic. The both IDSs should work in such way that they should be able to detect anomalies not only in CAN and Ethernet traffic but also in CAN over IP and IP over CAN traffic.

The proposed solution gives the design and deployment strategy for the in-vehicle CAN and Ethernet IDSs such that 1) The deployed IDS components are able to monitor all CAN, Ethernet, CAN over IP, and IP over CAN traffic; 2) Designed automotive IDS is able to detect anomalies not only in CAN and Ethernet traffic but also detect anomalies in CAN over IP, and IP over CAN particularly attacks with long paths and attacks influencing more than one network. The goal of this disclosure in particular is, for the in-vehicle IDS to be able to 1) monitor all kinds of CAN and Ethernet traffic inside the vehicle and 2) detect attacks with longer paths traversing from one network to another network and related attacks on multiple networks. For this purpose, a design and deployment strategy for the CAN and Ethernet IDS components is proposed in this disclosure.

As mentioned previously, both IDS components are deployed in CAN, the Ethernet IDS will not be able to see the IP based traffic from/to external components and hence, will not be able to detect anomalies in IP traffic. Likewise, if both IDS components are deployed in Ethernet network, the CAN IDS will not be able to see the CAN traffic from/to CAN ECUs, hence, will not be able to detect anomalies in CAN traffic. In order to handle such situation a distributed IDS deployment approach is proposed in this disclosure.

Moreover, a hierarchical IDS for in-vehicle network is designed where a Root IDS component will work collaboratively with both CAN and Ethernet IDS components to obtain log information from both CAN and Ethernet IDS components in order to analyze and detect attacks with longer paths and attacks on multiple networks. Furthermore, the Root IDS will be reporting to a Backend Cloud IDS for the new attacks detection.

The hierarchical IDS designed in this way will not only be able to monitor and analyze CAN and Ethernet traffic for possible anomalies but also detect attacks with a longer path in CAN over IP and IP over CAN traffic and an attack on one network leading to a possible attack on the other network. It will further be able to respond to the attacks. The designed IDS will also be able to update the in-vehicle IDS when a new attack will be detected. The distributed deployment of in-vehicle IDS on more than one switch will help to monitor the traffic taking different routes due to more than one route available in modern cars because of the more than one switch.

According to the propose solution, for the above two cases (the case in which the same packet may be detected as a normal packet by an Ethernet IDS but later detected as an attack by a CAN IDS and the case in which the same packet may be detected as an attack message by the Ethernet IDS whereas detected as a normal CAN frame by the CAN IDS), thanks to the introduction of the Root IDS, knowledge of the whole attack path may help in enforcing the necessary security measures on the attack path to block that path for future attacks, making it harder for the attackers to exploit those attack paths again.

Further, for the last case where new attacks may not be detected by both CAN and Ethernet IDSs working in isolation, the currently Cloud IDS helps in finding the new attacks such as Zero Day attacks which are not detected by the individual IDSs. In the proposed solution the Root IDS can detect these attacks since 1) it gets the context knowledge of both CAN and Ethernet networks by obtaining both IDSs' log/reporting information; 2) In addition, Root IDS knows the complete path of a packet whereas individual IDSs only see the path within their own respective networks; 3) Furthermore, since the Root IDS is simply one component, it can be deployed on a powerful vehicle component with more computing/storage resources which enables it to use complex intrusion analysis techniques like Artificial Intelligence to detect those attacks which may not be detected by the lightweight techniques used by individual CAN and Ethernet IDSs.

Figure 5:
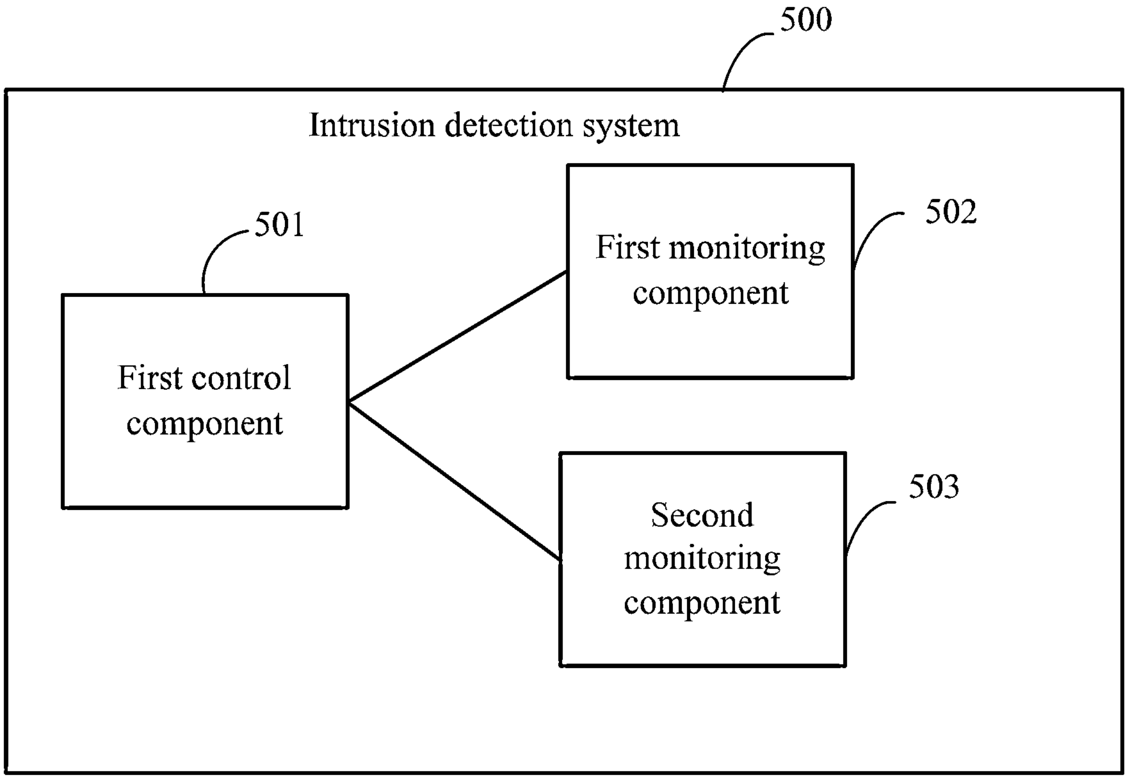
FIG. 5 is a schematic structural diagram of an intrusion detection system according to an embodiment of the present disclosure.

FIG. 5 is a schematic structural diagram of an intrusion detection system according to an embodiment of the present disclosure. The system 500 may be applied in a vehicle and may include three components: a first control component 501, a first monitoring component 502 and a second monitoring component 503.

The first monitoring component 502 is deployed in a CAN and the second monitoring component 503 is deployed in an Ethernet network; both of the first monitoring component 502 and the second monitoring component 503 are connected to the first control component 501.

The first monitoring component 502 is configured to obtain first CAN reporting information on data traffic in the system and transmit the first CAN reporting information to the first control component 502; the second monitoring component 503 is configured to obtain second Ethernet reporting information on the data traffic and transmit the second Ethernet reporting information to the first control component 501; and the first control component 501 is configured to receive the first CAN reporting information from the first monitoring component 502 and the second Ethernet reporting information from the second monitoring component 503, and determine whether the data traffic is an attack according to the first CAN reporting information and the second Ethernet reporting information.

The vehicle herein may support different kinds of bus technologies, for example, the CAN bus technology and the Ethernet technology, in the following, descriptions will be made with reference to this two kinds of bus technology, however, the same principle applies for other kinds of bus technologies.

Each of the CAN and the Ethernet network may be a CAN or an Ethernet. In a possible implementation, the first monitoring component may be consequently a CAN IDS, and the second monitoring component may be an Ethernet IDS.

The data traffic herein refers to the data traffic in the system. As described previously, taking an example where the vehicle supports the CAN bus technology and the Ethernet technology as an example, the data traffic may be CAN to IP traffic (in the case where the data traffic is from the CAN to the Ethernet network) or IP to CAN traffic (in the case where data traffic is from the Ethernet network to the CAN). Besides, the data traffic may pass the first monitoring component/second monitoring component or may not pass the first monitoring component/second monitoring component, depending on different application scenarios and different hierarchies, which is not limited in the present disclosure. It should be noted that the solutions of the present disclosure apply in both cases (CAN to IP traffic or IP to CAN traffic). That is, the description throughout the whole specification, which may be made by taking an example where the data traffic is from the CAN to the Ethernet network, also applies in the case where the data traffic is from the Ethernet network to the CAN. The operation principle for each component is similar for both cases, detailed descriptions may be omitted for the sake of brevity.

The first CAN reporting information herein reflects CAN properties of the data traffic in the system, which may be obtained or obtained by the first monitoring component 502 in a direct manner or in an indirect manner. Regarding the content of the first CAN reporting information, it may be anomaly log information of the data traffic, such as a sender of a packet, a frequency of the packet etc. Regarding the manner in which the first CAN reporting information is obtained, in an implementation, the first CAN reporting information may be obtained in a direct manner, e.g., generated by the first monitoring component 502 according to the data traffic passing thereby. In another possible implementation, the first monitoring component 502 may obtain the first CAN reporting information in an indirect manner, for example, the first monitoring component 502 may generate the first CAN reporting information by analyzing information reported by other components. Both of the above manners will be elaborated in detail in the following.

Similarly, the second Ethernet reporting information herein reflects Ethernet properties of the data traffic in the system, which may be obtained or obtained by the second monitoring component 503 in a direct manner or in an indirect manner. Regarding the content of the second Ethernet reporting information, it may be anomaly log information of the data traffic, such as a sender of a packet, a frequency of the packet and etc. Regarding the manner in which the second Ethernet reporting information is obtained, in an implementation, the second Ethernet reporting information may be obtained in a direct manner, e.g., generated by the second monitoring component 503 according to the data traffic passing thereby. In another possible implementation, the second monitoring component 503 may obtain the second Ethernet reporting information in an indirect manner, for example, the second monitoring component 503 may generate the second Ethernet reporting information by analyzing information reported by other components.

In the above-mentioned indirect manner, the first monitoring component and the second monitoring component act as master monitoring components, which receive reporting information from their respective slave components. In that case, the first monitoring component and the second monitoring component may also be referred to as master monitoring components.

The first control component 501 is responsible for monitoring the data traffic in the intrusion detection system based on the first CAN reporting information reported by the first monitoring component 502 and the second Ethernet reporting information reported by the second monitoring component 503. The first control component actually takes place of the first monitoring component and the second monitoring component to monitor the CAN over IP traffic or IP over CAN traffic.

It should be noted that the number of the components in the drawings throughout the whole description is just for illustrative purpose, and should not be construed as a limitation to the present disclosure. There may exist more than one first monitoring component deployed on different switches or more than one second monitoring component deployed on different switches, in that case, each first monitoring component may perform the same operation as the first monitoring component 502, and each second monitoring component may perform the same operation as the second monitoring component 503, and the first control component 501 may analyze the first CAN reporting information obtained from all the first monitoring component and the second Ethernet reporting information obtained from all the first monitoring component synthetically to determine whether the data traffic is an attack.

According to the embodiment of the present disclosure, the first monitoring component obtains first CAN reporting information on data traffic in the system and transmits the first CAN reporting information to the first control component, the second monitoring component is configured to obtain second Ethernet reporting information on the data traffic and transmit the second Ethernet reporting information to the first control component, the first control component receives the first CAN reporting information from the first monitoring component and the second Ethernet reporting information from the second monitoring component, and determines whether the data traffic is an attack according to the first CAN reporting information and the second Ethernet reporting information. Thanks to the hierarchical structure formed by the first monitoring component, the second monitoring component and the first control component, the first monitoring component and the second monitoring component obtain first CAN reporting information and second Ethernet reporting information respectively, and the first control component makes determination on whether the data traffic is an attack based on the first CAN reporting information obtained by the first monitoring component and the second Ethernet reporting information obtained by the second monitoring component, thereby linking the two components together by performing a global analysis on the received reporting information, hence rendering it possible to monitor the traffic passing from one network to another network, such as the CAN over IP traffic or the IP over CAN traffic.

As described above, the first monitoring component may obtain the first CAN reporting information in a direct manner or in an indirect manner, similarly, the second monitoring component may obtain the second Ethernet reporting information in a direct manner or in an indirect manner. Different manners will be implemented depending on different hierarchical structures. In the following, different deployments of the intrusion detection system will be elaborated with reference to the embodiments of the present disclosure.

Figure 6A:
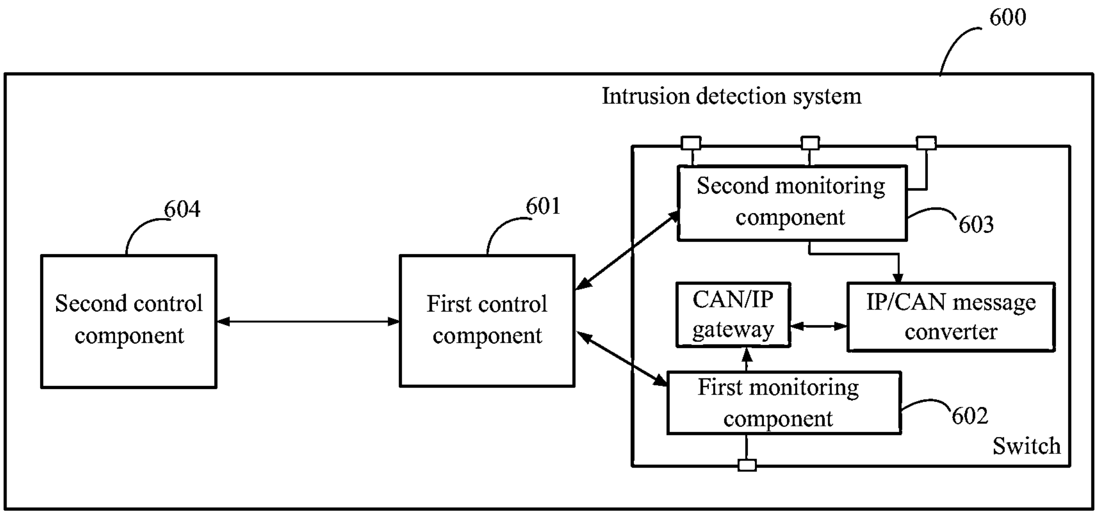
FIG. 6*a* is a schematic structural diagram of an intrusion detection system according to an embodiment of the present disclosure.

FIG. 6*a* is a schematic structural diagram of an intrusion detection system according to an embodiment of the present disclosure. As shown in FIG. 6*a*, the intrusion detection system 600 includes a first control component 601, a first monitoring component 602 and a second monitoring component 603, both of the first monitoring component 602 and the second monitoring component 603 are connected to the first control component 601.

As shown in FIG. 6*a*, the first monitoring component 602 is deployed in a CAN, the second monitoring component 603 is deployed in an Ethernet network, and the data traffic is from the CAN to the Ethernet network.

In a possible implementation, the data traffic in the system is from the CAN to the Ethernet network, the first monitoring component 602 is configured to process the data traffic to generate the first CAN reporting information, pass the processed data traffic to the second monitoring component and transmit the first CAN reporting information to the first control component 601; the second monitoring component 603 is configured to receive the processed data traffic from the first monitoring component, process the processed data traffic to generate second Ethernet reporting information and transmit the second Ethernet reporting information to the first control component 601; and the first control component 601 is configured to receive the first CAN reporting information from the first monitoring component 602 and the second Ethernet reporting information from the second monitoring component 603, analyze the first CAN reporting information and the second Ethernet reporting information to generate combined reporting information, and determine whether the data traffic is an attack according to the combined reporting information.

In a possible implementation, the data traffic in the system is from the Ethernet network to the CAN; similarly, since the data traffic flows in the opposite way, so the operations of the first monitoring component 602 and the second monitoring component 603 may change. Specifically, the second monitoring component 603 is configured to process the data traffic to generate second Ethernet reporting information, and transmit the second Ethernet reporting information to the first control component 601 and pass the processed data traffic to the first monitoring component 602; the first monitoring component 602 is configured to receive the processed data traffic from the second monitoring network 603, process the processed data traffic to generate the first CAN reporting information and transmit the first CAN reporting information to the first control component 601; and the first control component 601 is configured to receive the first CAN reporting information from the first monitoring component 602 and the second Ethernet reporting information from the second monitoring component 603, and determine whether the data traffic is an attack according to the first CAN reporting information and the second Ethernet reporting information.

In a possible implementation, the first monitoring component and the second monitoring component may be deployed in the same switch, the following description may be mainly focused on this kind of implementation. However, it should be noted that in the above description, the first monitoring component and the second monitoring component are shown in the same switch, however, the above solution also applies when the first monitoring component and the second monitoring component locate in different switches. For example, the first monitoring component is deployed in a first switch, the second monitoring component is deployed in a second switch, the first control component includes an IDS and is deployed outside the first switch and the second switch. The functions of the components are as same as the case where the first monitoring component and the second monitoring component are deployed in the same switch, which will not be detailed herein again for brevity.

In a possible implementation, the first monitoring component 602 is connected to the first control component 601 via a first-type connection (such as a CAN connection as described below) and the second monitoring component 603 is connected to the first control component via a second-type connection (such as an Ethernet connection as described below).

Besides, it should be also noted that FIG. 6*a* is simply a schematic diagram, where the first monitoring component 602 is deployed in the CAN and the second monitoring component 603 is deployed in the Ethernet network. In the following, the detailed deployment of the two monitoring components will be discussed.

As described previously, in the embodiment, the first monitoring component 602 obtains the first CAN reporting information in a direct manner. In addition to the first CAN reporting information, the first control component 601 may also receive second Ethernet reporting information from the second monitoring component 603. Hence, in this hierarchical structure, the second monitoring component 603 has the same position as the first monitoring component 602, that is, both of the first monitoring component 602 and the second monitoring component 603 report to the first control component 601, so that the first control component 601 may combine the first and second Ethernet reporting information together to make a better decision.

In a possible implementation, the first control component 601 is further configured to perform a preventive operation in response to determining that the data traffic is an attack.

In a possible implementation, the preventive operation includes any one or more of following operations: logging of the attack; notification of the attack; initiation of a safe vehicle state process to bring the vehicle into a safe state; or, blocking of the attack. In a possible implementation, the intrusion detection system may further include a second control component 604 connected to the first control component 601. Where the first control component 601 is further configured to transmit the combined reporting information to the second control component 604 in response to determining that the data traffic is not an attack; and the second control component 604 is configured to analyze the combined reporting information and reporting information from other vehicles to determine whether the data traffic is a new attack. The second control component has more information on attacks, and can thus perform a better detection than the first control component. Since the second control component has more abundant information on attacks, thereby improving the accuracy of the intrusion detection.

In a possible implementation, the second control component 604 is further configured to monitor a working status of the first control component 601.

In a possible implementation, the second control component 604 is further configured to generate an alert in response to determining that the data traffic is a new attack.

In a possible implementation, the second control component 604 is further configured to, in response to determining that the data traffic is a new attack, notify the first control component 601 of update data, where the update data indicates a strategy for handling a new attack; and the first control component 601 is further configured to perform an update operation according to the update data.

In a possible implementation, the first control component 601 is further configured to notify the first monitoring component 602 and the second monitoring component 603 of update data, where the update data indicates a strategy for handling a new attack; and the first monitoring component 602 is further configured to perform an update operation according to the update data, and the second monitoring component 603 is further configured to perform the update operation according to the update data.

In a possible implementation, the update operation includes one or more of the following operations: update of an intrusion detection rule; update of an intrusion signature; update of an intrusion detection algorithm; or, notification of a newly trained model to detect the new attack.

In a possible implementation, the first CAN reporting information is log information of the data traffic, and the second Ethernet reporting information is log information of the processed data traffic.

In a possible implementation, the first monitoring component 602 may include an IDS, the second monitoring component 603 may also include an IDS, the CAN may be CAN, and the Ethernet network may be Ethernet, the first control component may also include an IDS.

In a possible implementation, the first control component 601 is further configured to monitor a working status of the first monitoring component 602 and a working status of the second monitoring component 603. The monitoring of the working status may be implemented in several possible ways. For example, the first control component 601 may periodically send an advanced attack message to the first monitoring component 602 and the second monitoring component 603 to test the working of these components. The first control component 601 may be configured to send an alert to the second control component to inform the status of those particular first monitoring component and second monitoring component in response to determining that the working status is abnormal.

Take it as an example where the first monitoring component is referred to as a CAN IDS component or simply CAN IDS, the second monitoring component is referred to as an Ethernet IDS component or simply Ethernet IDS, the first control component may be referred to as a Root IDS component or simply Root IDS, and the second control component may be referred to as a Backend Cloud IDS component or simply Backend Cloud IDS.

The principal objective of this disclosure is to overcome at least some of the shortcomings of the prior intrusion detection methods for a vehicle. This is achieved by providing a vehicle monitoring system included of CAN and Ethernet IDSs, where CAN IDS is configured to monitor the messages originating from CAN bus and messages coming from Ethernet ECU (network) to CAN bus and Ethernet IDS is configured to monitor the packets (the aforementioned data traffic from the CAN to the Ethernet network) originating from Ethernet devices and messages coming from CAN bus to Ethernet devices (network) for intrusion detection in CAN, Ethernet, CAN over IP, and IP over CAN traffic with focus on the design and deployment strategy for the above mentioned vehicle monitoring system.

As described previously, an IP over CAN packet from external components detected as a normal packet by Ethernet IDS may be an intrusion detected by CAN IDS. Similarly, a CAN over IP frame from CAN ECUs detected as normal by CAN IDS may be an attack. If CAN and Ethernet IDSs work independently, they will not be able to detect the complete attack path of such attacks.

Moreover, if there is an attack in one network it may indicate a possible attack in other network, e.g., DoS attack. Again if both IDSs work independently, they will not be able to look for such attacks relationships/possibilities.

In the proposed disclosure, both CAN IDS component and the Ethernet IDS component are connected to another IDS component that is the Root IDS in order to work cooperatively, as shown in the accompany drawings, such as FIG. 5, where the first control component may be a Root IDS, the first monitoring component may be a CAN IDS/Ethernet IDS, correspondingly, the second monitoring component may be an Ethernet IDS/CAN IDS.

The Root IDS obtains the log information from both CAN IDS and Ethernet IDS. It analyzes this log information obtained from both IDSs in order to detect long path of an attack and related attacks on different networks.

An IP over CAN packet will be first analyzed by the Ethernet IDS based on the IP packet's features such as source/destination MAC/IP addresses, port numbers etc., for a possible intrusion. It will be then passed to the CAN IDS after translation to a CAN frame by the CAN/IP Gateway. CAN IDS will analyze the converted CAN frame based on CAN frame's features like CAN ID, payload etc., for a possible intrusion. Same process will be repeated for a CAN over IP message in the opposite direction. A message may be detected as an attack message by both IDSs. Moreover, if a message is detected as a normal message by one IDS, it may be detected as an intrusion message by the other IDS. The log data obtained from both IDSs will help the Root IDS to detect the complete path of the attack messages in CAN over IP and IP over CAN traffic, and hence identify the complete attack pattern. Moreover, if an attack is detected on one network, e.g., on CAN, it may indicate a possible attack on the other network, i.e., Ethernet network and this information will help analyze the communication on other network for possible intrusion and relationship of the attacks.

For deployment, if both IDS components are deployed in CAN, the Ethernet IDS will not be able to see the IP based traffic from/to external components and hence, will not be able to detect anomalies in IP traffic. Likewise, if both IDS components are deployed in Ethernet network, the CAN IDS will not be able to see the CAN traffic from/to CAN ECUs, hence, it will not be able to detect anomalies in CAN traffic.

Therefore, in order to make both IDSs to be able to monitor their respective traffic, a distributed IDS deployment approach is proposed in this disclosure.

Figure 7A:
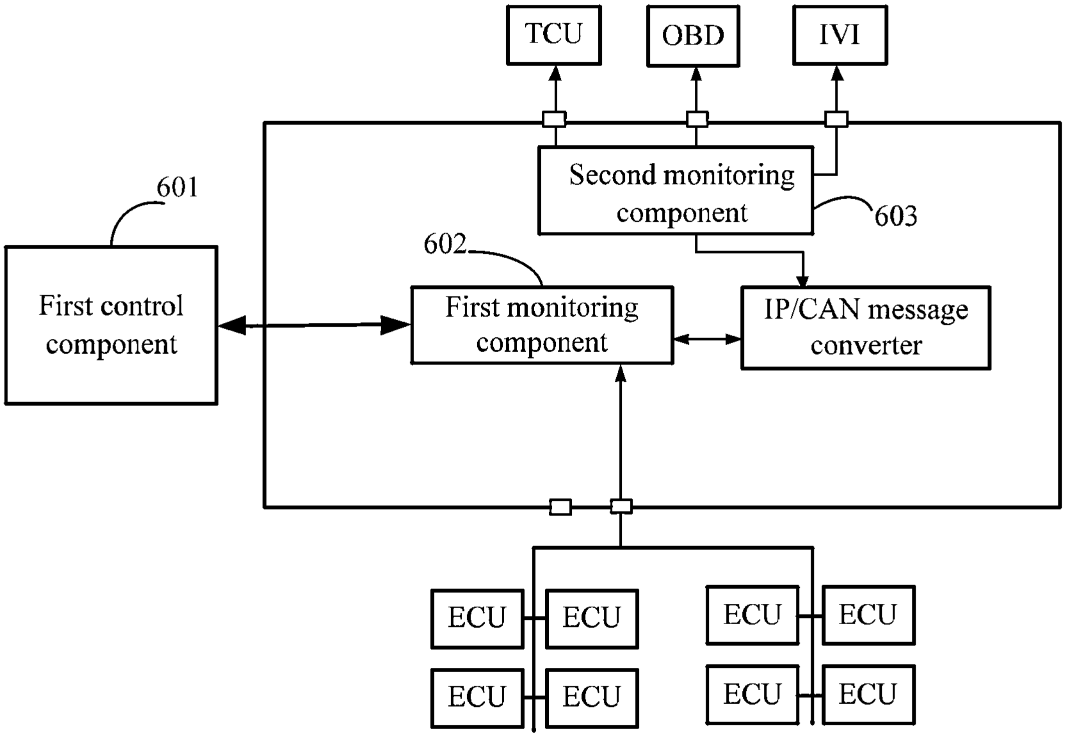
FIG. 7*a* is a schematic structural diagram showing a deployment of a first monitoring component in a switch according to an embodiment of the present disclosure.
Figure 7B:
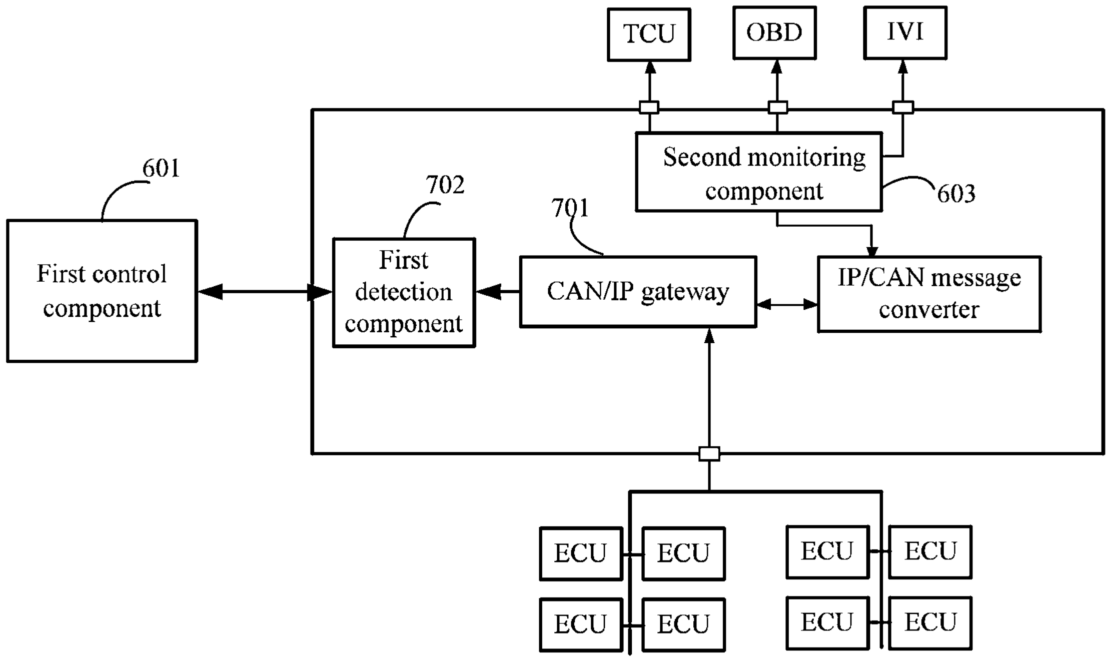
FIG. 7*b* is a schematic structural diagram showing a further deployment of a first monitoring component in a switch according to an embodiment of the present disclosure.
Figure 7C:
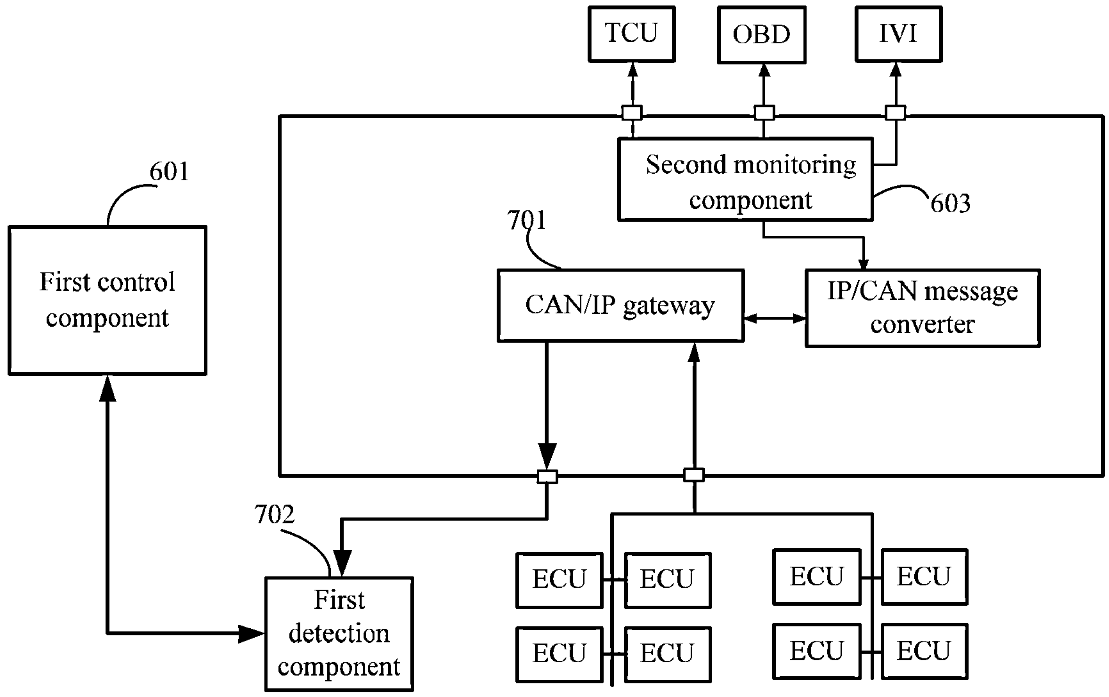
FIG. 7*c* is a schematic structural diagram showing a further deployment of a first monitoring component in a switch according to an embodiment of the present disclosure.

Regarding the deployment of the CAN IDS (i.e., the first monitoring component 602), as described in the above with reference to FIGS. 7*a*-7*c*, the basic principle of arranging the CAN IDS is to let the CAN traffic passing thereby. The CAN IDS may be deployed between CAN/IP Gateway and CAN. The CAN IDS can be placed as a software component deployed on the switch, e.g., on the CAN/IP Gateway; or, the CAN IDS can be deployed as a NIDS device inside the switch connected to CAN/IP Gateway so that it can receive CAN traffic; or, the CAN IDS can also be deployed as a NIDS device attached to an outer port of the switch.

FIG. 7*a*-FIG. 7*c* show different deployment options. In a possible implementation, as shown in FIG. 7*a*, the first monitoring component 602 includes an IDS and may be deployed on a gateway (not shown) in the CAN. In another possible implementation, the first monitoring component 602 includes a gateway 701 (i.e., the first switching component) and a first detection device 702 including an IDS, the gateway 701 is connected to the first detection device 702, the first detection device 702 is connected to the first control component 603; the first detection device is configured to generate the first CAN reporting information and the gateway is configured to process the data traffic, in this implementation, the first detection device 702 may be deployed inside (FIG. 7*b*) or outside the switch (FIG. 7*c*).

Figure 8A:
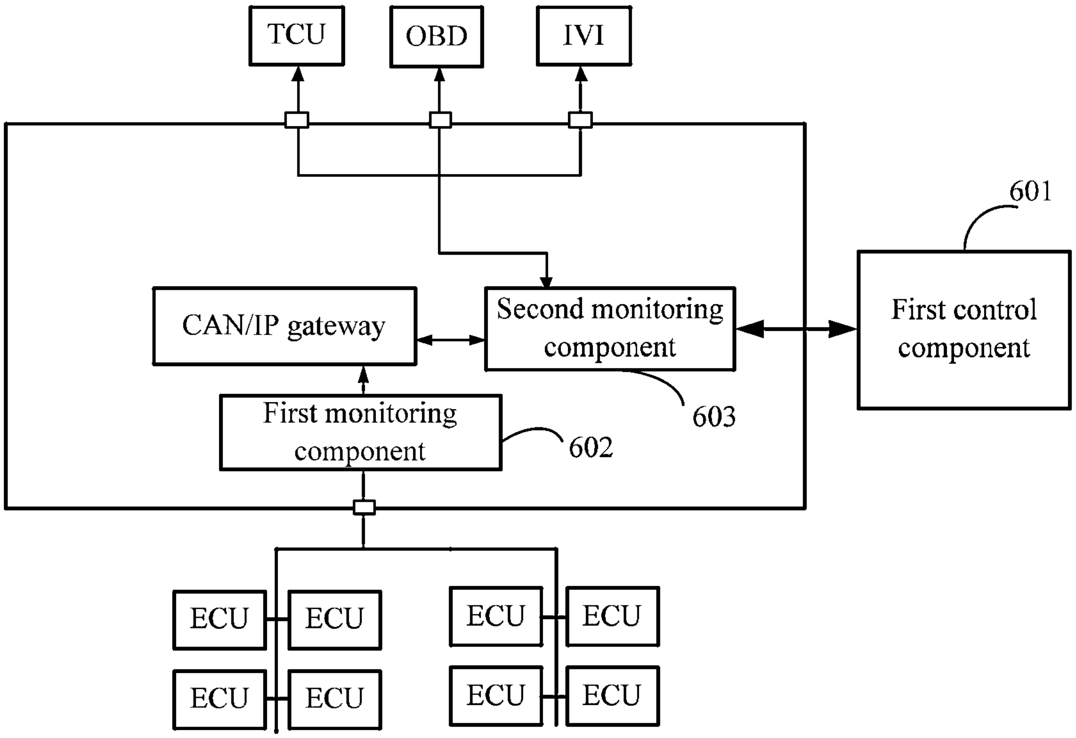
FIG. 8*a* is a schematic structural diagram showing a deployment of a second monitoring component in a switch according to an embodiment of the present disclosure.
Figure 8B:
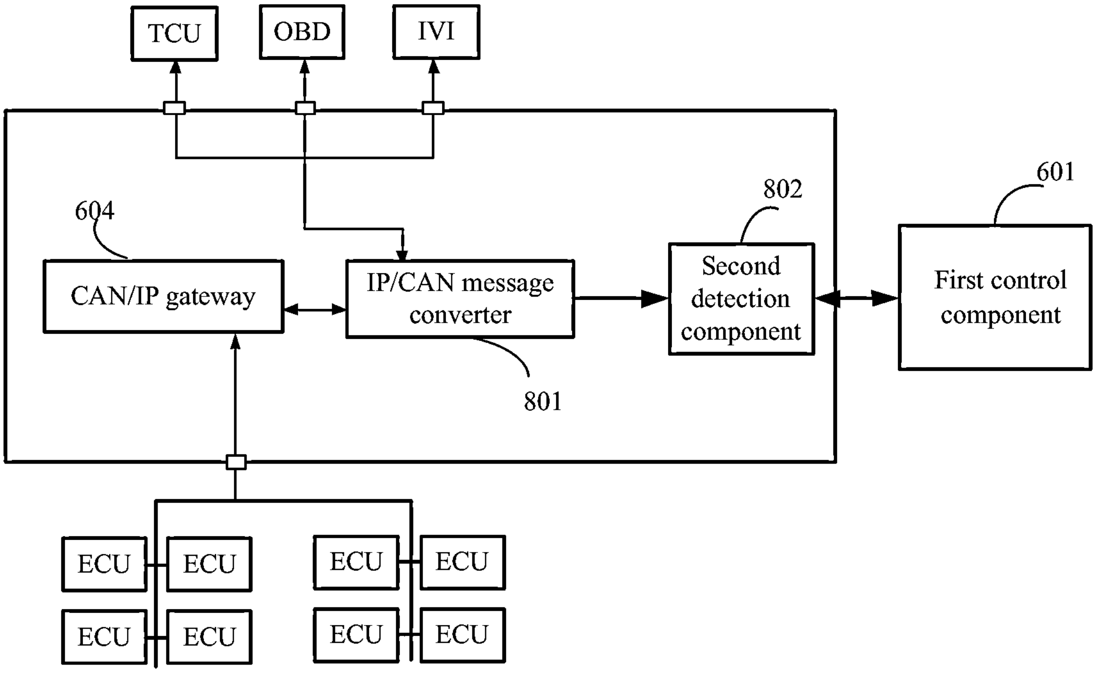
FIG. 8*b* is a schematic structural diagram showing a further deployment of a second monitoring component in a switch according to an embodiment of the present disclosure.
Figure 8C:
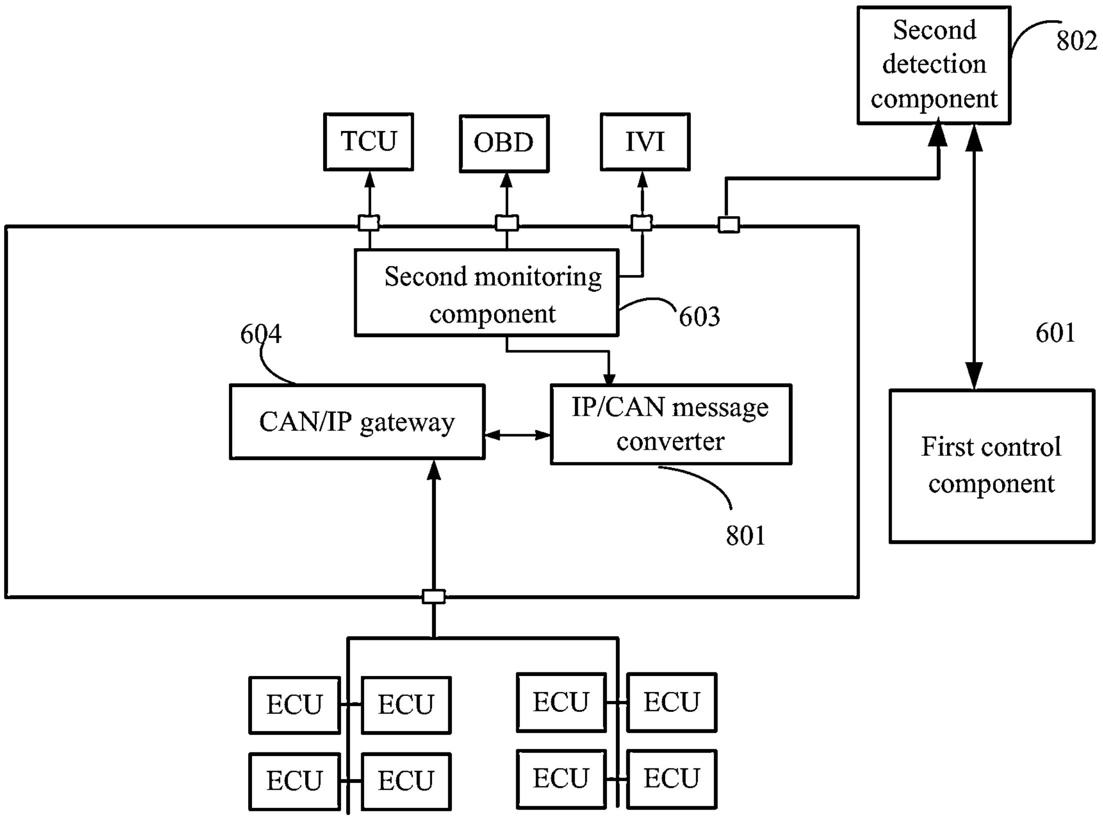
FIG. 8*c* is a schematic structural diagram showing a further deployment of a second monitoring component in a switch according to an embodiment of the present disclosure.

Similarly, regarding the deployment of the Ethernet IDS (i.e., the second monitoring component 603), as described in the above with reference to FIGS. 8*a*-8*c*, the basic principle of arranging the Ethernet IDS is to let the IP traffic passing thereby. The Ethernet IDS is deployed between CAN/IP Message Converter and external components that may be a TCU port, an OBD port, an IVI port etc. The Ethernet IDS can be placed as a software component deployed on the switch, e.g., on the CAN/IP Message Converter; or, the Ethernet IDS can deployed as a NIDS device inside the switch connected to CAN/IP Message Converter; or, the Ethernet IDS can be deployed as a NIDS hardware device attached to the outer port of the switch.

FIG. 8*a*-FIG. 8*c* show different deployment options. In a possible implementation, as shown in FIG. 8*a*, the second monitoring component 603 includes an IDS and may be deployed on a message converter (not shown) in the Ethernet network. In another possible implementation, the second monitoring component 603 includes a message converter 801 (i.e., a second switching component) and a second detection device 802 deployed with an intrusion detection system IDS, the message converter is connected to the second detection device, and the second detection device is connected to the first monitoring component; the second detection device is configured to generate the second Ethernet reporting information and the message converter is configured to process the processed data traffic, in this implementation, the second detection device 802 may be deployed inside (FIG. 8*b*) or outside the switch (FIG. 8*c*).

Regarding the deployment of the Root IDS (i.e., the first control component 601), the Root IDS component will be deployed in any of the following way. The Root IDS may be deployed in a dedicated hardware device attached to an outer port of the switch or inside the switch; or, the Root IDS may be implemented as a Root IDS software deployed on the switch; or the Root IDS may be implemented as a Root IDS software or hardware deployed on any vehicle domain controller device connected to the switch.

Figure 6B:
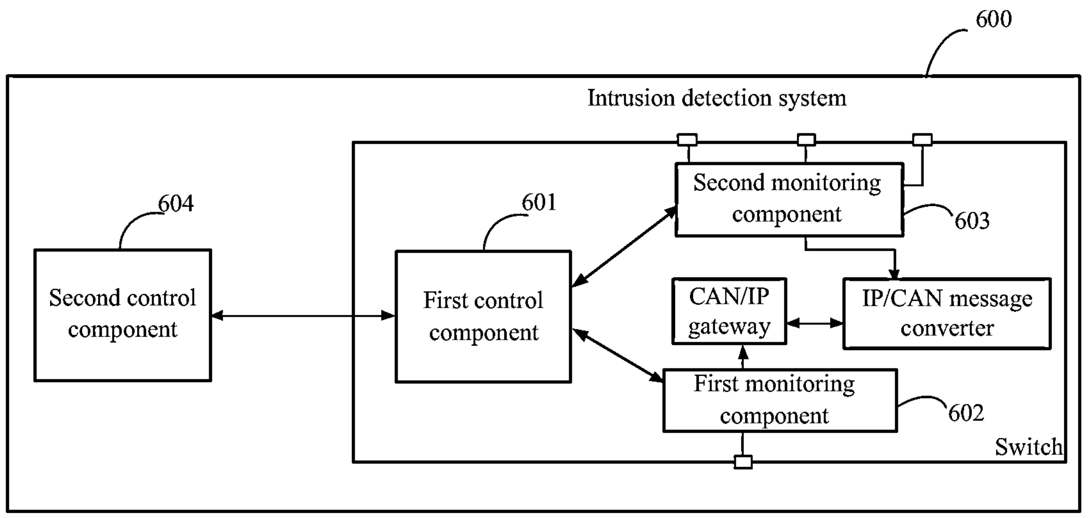
FIG. 6*b* is a schematic structural diagram of another intrusion detection system according to an embodiment of the present disclosure.

Different deployment options are shown in the drawings. In a possible implementation, as shown in FIG. 6*b*, the first control component 601 may be deployed inside the switch separated from the first monitoring component 602 and the second monitoring component 603. In another possible implementation, as shown in FIG. 6*a*, the first control component 601 may be deployed outside the switch. In this implementation, the three components, i.e., the first control component 601, the first monitoring component 602 and the second monitoring component 603 may be implemented in the same switch, so the intrusion detection system may be actually realized as a system inside a particular device.

Figure 9:
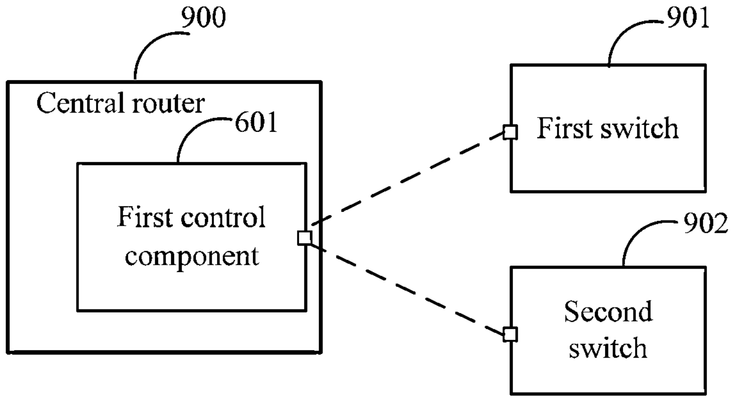
FIG. 9 is a schematic structural diagram showing a deployment of a first control component according to an embodiment of the present disclosure.

In some cars, all switches inside the car may be physically connected to a single router (Gateway) inside the vehicle. In that case, as shown in FIG. 9, the Root IDS (i.e., the first control component 601) will be deployed on the central router 900 as a hardware device inside or outside of the router or a software deployed on the router. The first control component 601 will be connected to both of the first switch 901 and the second switch 902.

The CAN and Ethernet IDSs deployed in this way will not only be able to monitor CAN and Ethernet traffic inside CAN and Ethernet networks respectively but can also collaboratively monitor CAN over IP and IP over CAN traffic covering the long paths of these traffic types. It helps them to detect the attacks with long paths, with the help of Root IDS, coming from the CAN over IP and IP over CAN traffic. The Root IDS will also be able to identify the related attacks on both networks.

In this embodiment of the solution, the Root IDS performs an additional responsibility other than analyzing CAN over IP and IP over CAN traffic for long paths attacks and related attacks on multiple networks. Rest of the details are same as described in embodiment one of the solution unless specified.

The Root IDS will act as an Intrusion Prevention System (IPS) in addition to Intrusion Detection System (IDS), known as IDPS, in this embodiment. The Root IDS component will analyze the log information obtained from the CAN and Ethernet IDSs for possible intrusions. Once an attack is detected, either by CAN IDS, Ethernet IDS, or Root IDS, the Root IDS will issue preventive steps (prevention) to respond to the attack. The attack response may be of any form. For example, it may only log the incident and do not proceed further, i.e., a passive response. Another possible response is to notify the attack by generating an alert. Another possible response is where Root IDS will initiate a safe vehicle state process which brings the vehicle in a safe state, attempting to alleviate the effects of security attack on the vehicle. Another possible response, which is comparatively a more strong and ideal response, is to completely block the security attack.

In third embodiment of the solution, the Root IDS component is further connected to a Cloud Backend IDS component for the detection of novel attacks (e.g., zero day attack), thus forming a hierarchical IDS architecture for automotive intrusion detection. Rest of the details are same as in embodiments one and two.

The Root IDS component will obtain log information from both CAN and Ethernet IDSs and, after analysis, sends its own generated log information to the Backend Cloud IDS component. The Backend Cloud IDS will obtain similar log data from several such vehicles. The Backend Cloud IDS component will carry out a thorough analysis of the log data combined with the log data obtained from other vehicles. It will help Cloud Backend data to detect novel attacks which remained undetected by the In-Vehicle IDS components of the individual vehicle.

The Backend Cloud IDS component will have additional responsibility when a novel attack is detected. On detection of new attacks, the Backend Cloud IDS will generate an alert and update the in-vehicle IDS components to prepare them to handle this attack in the future. The Backend Cloud IDS component will update the Root IDS component directly and the CAN and Ethernet IDS components inside the vehicle via the Root IDS component. The updating of in-vehicle IDS components will involve one or more of the following: update of intrusion detection rules; update of intrusion signatures; update of intrusion detection algorithm; newly trained model to detect new attacks in future; or any other update of in-vehicle IDS components.

According to the embodiment of the present disclosure, the first control component receives reporting information from both of the monitoring components, thereby linking the two components together by performing a global analysis on the received reporting information, hence rendering it possible to monitor the traffic passing from one network to another network, such as the CAN over IP traffic or the IP over CAN traffic.

Figure 10:
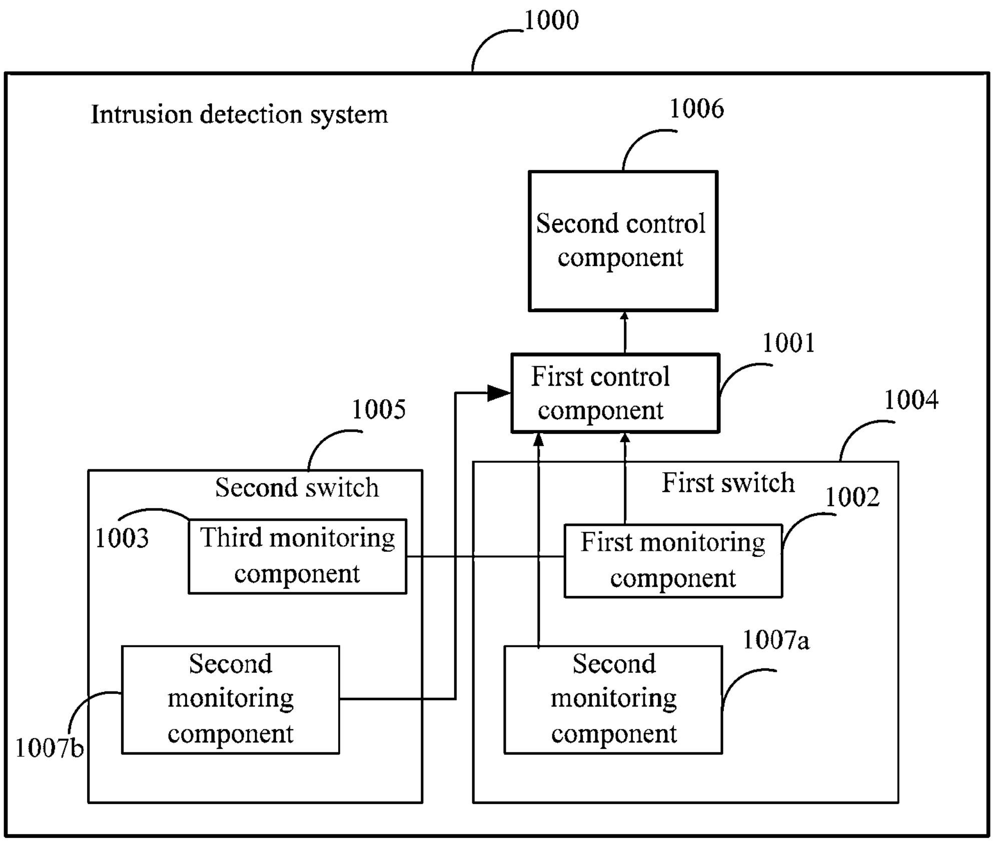
FIG. 10 is a schematic structural diagram of an intrusion detection system according to an embodiment of the present disclosure.

FIG. 10 is a schematic structural diagram of an intrusion detection system according to an embodiment of the present disclosure. As shown in FIG. 10, the intrusion detection system 1000 includes a first control component 1001, a first monitoring component 1002 connected to the first control component 1001, a third monitoring component 1003 connected to the first monitoring component 1002 and a second monitoring components 1007*a* and 1007*b*.

The first monitoring component 1002 is deployed in a first switch 1004, the third monitoring component 1003 is deployed in the CAN in a second switch 1005, and the first control component 1001 is deployed outside the first switch 1004 and the second switch 1005. It should be noted that the first control component 1001 may also be deployed inside the first switch 1004 or the second switch 1005.

Different from the above implementations, in the previous embodiment, the first monitoring component 602 and the second monitoring component 603 have the same position in the hierarchical structure; however, in this embodiment, the hierarchical structure may be regarded as containing three layers, where the first control component 1001 is in the higher layer and responsible for monitoring the first monitoring component 1002, the first monitoring component 1002, the second monitoring component 1007*a* and 1007*b* are in a middle layer, and the first monitoring component 1002 is responsible for monitoring the third monitoring component 1003, and the third monitoring component 1003 is in the lowest layer. In fact, the first monitoring component 1002 and the third monitoring component 1003 are working in a master-slave mode, the first monitoring component 1002 acts as a master component which has more responsibilities than the third monitoring component 1003. The second monitoring component 1007*a* and 1007*b* are working in a peer to peer mode, each performs the same task and functions in the same way as the second monitoring component 603, reference may be made to previous embodiments formed details.

The principle for choosing a master component may be to choose a component connected to devices by which more critical safety-related information will pass. In this embodiment, the first monitoring component 1002 may also be referred to as a master monitoring component, and the third monitoring component 1003 may also be referred to as a slave monitoring component.

As described above, the first monitoring component and the third monitoring component are working in the master-slave mode, it should be noted that the second monitoring component may also work in the master-slave mode, which will be described with reference to FIG. 11. In fact, any one or both of the first monitoring component and the second monitoring component may work in the master-slave mode, which is not limited in the embodiments of the present disclosure.

The third monitoring component 1003 is configured to generate third CAN reporting information and transmit the third CAN reporting information to the first monitoring component 1002; and the first monitoring component 1002 is configured to obtain the first CAN reporting information according to the third CAN reporting information from the third monitoring component 1003 and transmit the first CAN reporting information to the first control component 1001.

In a possible implementation, the intrusion detection system may further include a second control component 1006 connected to the first control component 1001. Where the first control component 1001 is configured to analyze the first CAN reporting information and the second Ethernet reporting information to generate combined reporting information, and transmit the combined reporting information to the second control component 1006; and the second control component 1006 is configured to receive combined reporting information from the first control component 1001 and perform a thorough analysis on the combined reporting information.

In a possible implementation, the first control component 1001 is configured to transmit the combined reporting information to the second control component 1006 in response to determining that the data traffic is not an attack; and the second control component 1006 is configured to analyze the combined reporting information and reporting information from other vehicles to determine whether the data traffic is a new attack. The second control component has more information on attacks, and can thus perform a better detection than the first control component.

In a possible implementation, the second control component 1006 is further configured to monitor a working status of the first control component 1001.

In a possible implementation, the second control component 1006 is further configured to generate an alert in response to determining that the data traffic is a new attack.

In a possible implementation, the second control component 1006 is further configured to, in response to determining that the data traffic is a new attack, notify the first control component 1001 of update data, where the update data indicates a strategy for handling a new attack; and the first control component 1001 is further configured to perform an update operation according to the update data.

In a possible implementation, the first control component 1001 is further configured to notify the first monitoring component 1002 of update data, where the update data indicates a strategy for handling a new attack; the first monitoring component 1002 is further configured to perform an update operation according to the update data, and notify the third monitoring component 1003 of the update data; and the third monitoring component 1003 is further configured to perform the update operation according to the update data.

In a possible implementation, the first control component 1001 is further configured to monitor a working status of the first monitoring component 1002, and the first monitoring component 1002 is further configured to monitor a working status of the third monitoring component 1003.

In a possible implementation, the update operation includes one or more of the following operations: update of an intrusion detection rule; update of an intrusion signature; update of an intrusion detection algorithm; or, notification of a newly trained model to detect the new attack.

In a possible implementation, the third CAN reporting information is log information of the data traffic.

In fact, the second control component 1006 functions in the same way as the second control component 604, and the first control component 1001 functions in the same way as the first control component 601, therefore, the details will not be described herein for brevity. Besides, although in the drawings, the second control component is missing in some figures, however, it should be understood that all the figures with a first control component may also be supplemented with a second control component which completes the same task as the second control component 604 or the second control component 1006.

Take it as an example where the first monitoring component, the third monitoring component and the first control component each includes an IDS, the first monitoring component here may be referred to as a Master IDS component or simply Master IDS, the third monitoring component may be referred to as a Slave IDS component or simply Slave IDS, the first control component may be referred to as a Root IDS component or simply Root IDS.

This embodiment designs a solution for distributed deployment of Ethernet and CAN IDS components on multiple switches.

In a modern vehicle, different ECUs/Sensors are connected to different switches inside the vehicle. For example, TCU, OBD, IVI etc., may be connected to the front switch whereas the rear switch may be connected to the charging port etc. Moreover, multiple switches provide multiple traffic flows and not all in-vehicle traffic passes through a single switch. Hence, deploying the IDS components on one switch only may not be sufficient to monitor all in-vehicle traffic.

Therefore, based on the devices/ECUs connected to each switch and the traffic flows passing by each switch, the IDSs will be deployed on more than one switch. The CAN and Ethernet IDS components on different switches will be working in a Peer-to-Peer fashion where each IDS component performs almost the same tasks.

However, some switches may be less prone to attacks than others based on the type of communication they receive. For example, the external components like TCU, OBD port and IVI are prone to more attacks and more complex attacks as compared to attacks entering in vehicle via charging ports. Therefore, the IDS components on multiple switches in that case will be working as Master-Slave IDSs with Master IDS having more capabilities/responsibilities than the Slave IDS.

The Master IDS will obtain intrusion log information (i.e., the third CAN reporting information) from all other slave IDS s and perform detailed analysis of attacks for advanced attacks detection which are not possible without having the log information from all the IDSs within the same network, e.g., CAN or Ethernet network. The Master IDS will be able to detect the following advanced attacks within its respective network which individual Slave IDS s within that network will not be able to detect: spoofed IP address in different segments of the Ethernet network, (Ethernet network); spoofed MAC address on other VLANs, (Ethernet network); correlation (of messages in different domains) (both in CAN and Ethernet networks); consistency (of data from redundant sources attached to multiple switches) (both in CAN and Ethernet networks); context aware intrusion detection (both in CAN and Ethernet networks); DDoS attack, (both in CAN and Ethernet networks) or any other such attack.

The Master IDS will be connected to the Root IDS for collaborative attack detections across the networks and possible preventive steps where Root IDS will be further connected to the Backend Cloud IDS as described in previous embodiments.

The Master IDS component may be deployed on a switch which monitors more critical traffic, e.g., a switch connecting TCU, OBD, and IVI devices whereas the Slave IDS component may be deployed on a switch with less critical traffic. In another variation of this embodiment, the Slave IDS components will be deployed on ECUs/external components.

In fact, the Master IDS, Root IDS, and Backend Cloud IDS components have an additional responsibility of monitoring the working status of the IDS component placed under that particular IDS component in the hierarchy, in addition to the detection of advanced attacks and the attacks with longer paths respectively.

In this embodiment of the solution, the Master IDS component will be further responsible for monitoring all the slave IDS components to ensure their proper working and to ensure if they are not compromised. This monitoring can be done in any possible way. For example, the Master IDS component will periodically send attack messages to the Slave IDS s to get a response from them in order to test their working. If any slave IDS is compromised and/or no longer responds to Master IDS or is unable to detect the attack, the Master IDS component will be configured to send, via Root IDS, an alert to the Backend Cloud System as well as to driver (HMI) to inform about the status of that particular Slave IDS component.

Similarly, the Root IDS component will be further responsible for monitoring all the Master IDS components to ensure their proper working and to ensure if they are not compromised. This monitoring can be done in any possible way. For example, the Root IDS component will periodically send an advanced attack message to the Master IDS's network to test the working of Master IDS. The Root IDS component will be configured to send an alert to the Backend Cloud System as well as to driver (HMI) to inform about the status of that particular Master IDS component. Likewise, the Cloud Backend IDS will monitor the working of the Root IDS inside the vehicle. This monitoring will help to make ensure that all IDS components are working fine and accordingly detecting the attacks. This check can be done at any times, for instance, after few hours or once per day when the vehicle first starts in the day.

In a possible implementation, there may also be more than one master monitoring component (e.g., Master IDS). The intrusion monitoring system may further include a fourth monitoring component connected to the second monitoring component and deployed in the Ethernet network; where the second monitoring component is deployed in the first switch, and the fourth monitoring component is deployed in the second switch; where the fourth monitoring component is configured to generate fourth Ethernet reporting information and transmit the fourth Ethernet reporting information to the first monitoring component; and the second monitoring component is configured to obtain the second Ethernet reporting information according to the fourth Ethernet reporting information and transmit the second Ethernet reporting information to the first control component. The second monitoring component may be configured to monitor a working status of the fourth monitoring component, in a similar way as the first monitoring component monitoring the third monitoring component.

Figure 11:
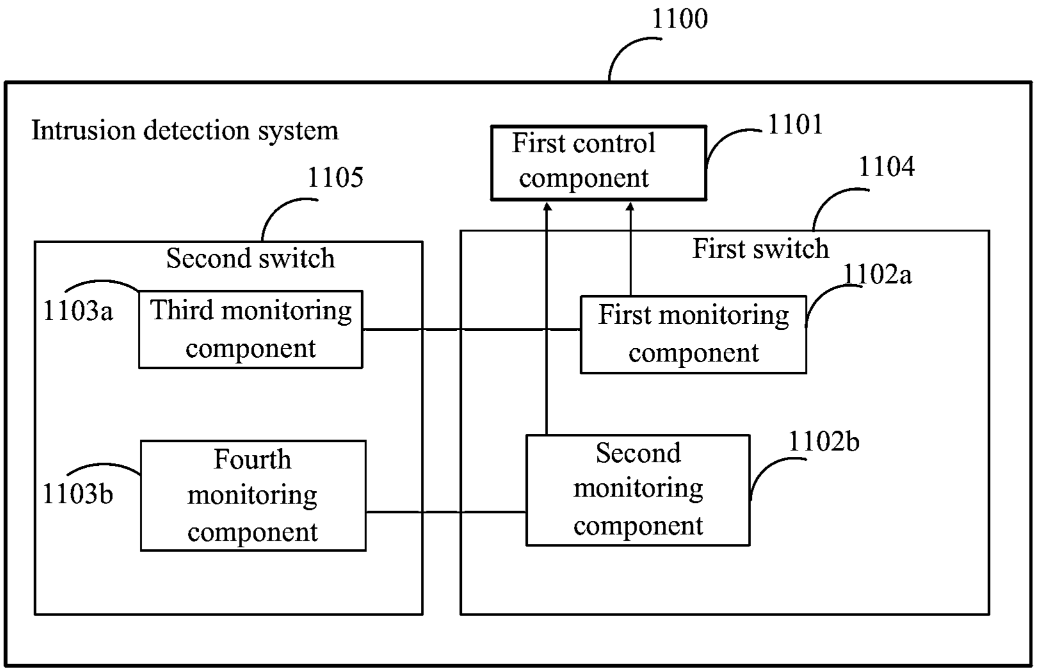
FIG. 11 is a schematic structural diagram of an intrusion detection system according to an embodiment of the present disclosure.

As shown in FIG. 11, in the intrusion detection system 1100, there are two master monitoring components and two slave monitoring components corresponding to the two master components. The two master monitoring components are the first monitoring component 1102*a* and the second monitoring component 1102*b*, and the two slave monitoring components are the third monitoring component 1103*a* and the fourth monitoring component 1103*b*. The two master monitoring component 1102*a* and 1102*b* are deployed in different networks, and the first control component 1101 is configured to receive the reporting information from each master monitoring component (1102*a* and 1102*b*), analyze the reporting information from each master monitoring component to generate combined reporting information, and determine whether the data traffic is an attack according to the combined reporting information. As described previously, the vehicle may support both CAN and Ethernet technologies, each network may have one master IDS. Hence, the two aforementioned master monitoring components may be two Master IDSs: a Master CAN IDS for CAN (such as the first monitoring component 1102*a*) and a Master Ethernet IDS (such as the second monitoring component 1102*b*) for Ethernet network. Both Master IDS components will be connected to the Root IDS which will be further connected to the Cloud Backend IDS System forming a hierarchical IDS architecture.

According to the embodiment of the present disclosure, the third monitoring component, the fourth monitoring component, the first monitoring component, the second monitoring component and the first control component form a hierarchical structure, where the first monitoring component analyzes the information reported by the third monitoring component, the second monitoring component analyzes the information reported by the fourth monitoring component, and the first control component further analyzes the information reported by the first monitoring component and the second monitoring component, thereby rendering it possible to detect the advanced attacks within its respective network which individual third monitoring components within that network will not be able to detect, thu s improving the accuracy of the intrusion detection. Besides, the combined reporting information generated by the first control component is transmitted to the second control component which has more abundant information on attacks, thus further improving the accuracy of the intrusion detection.

Figure 12:
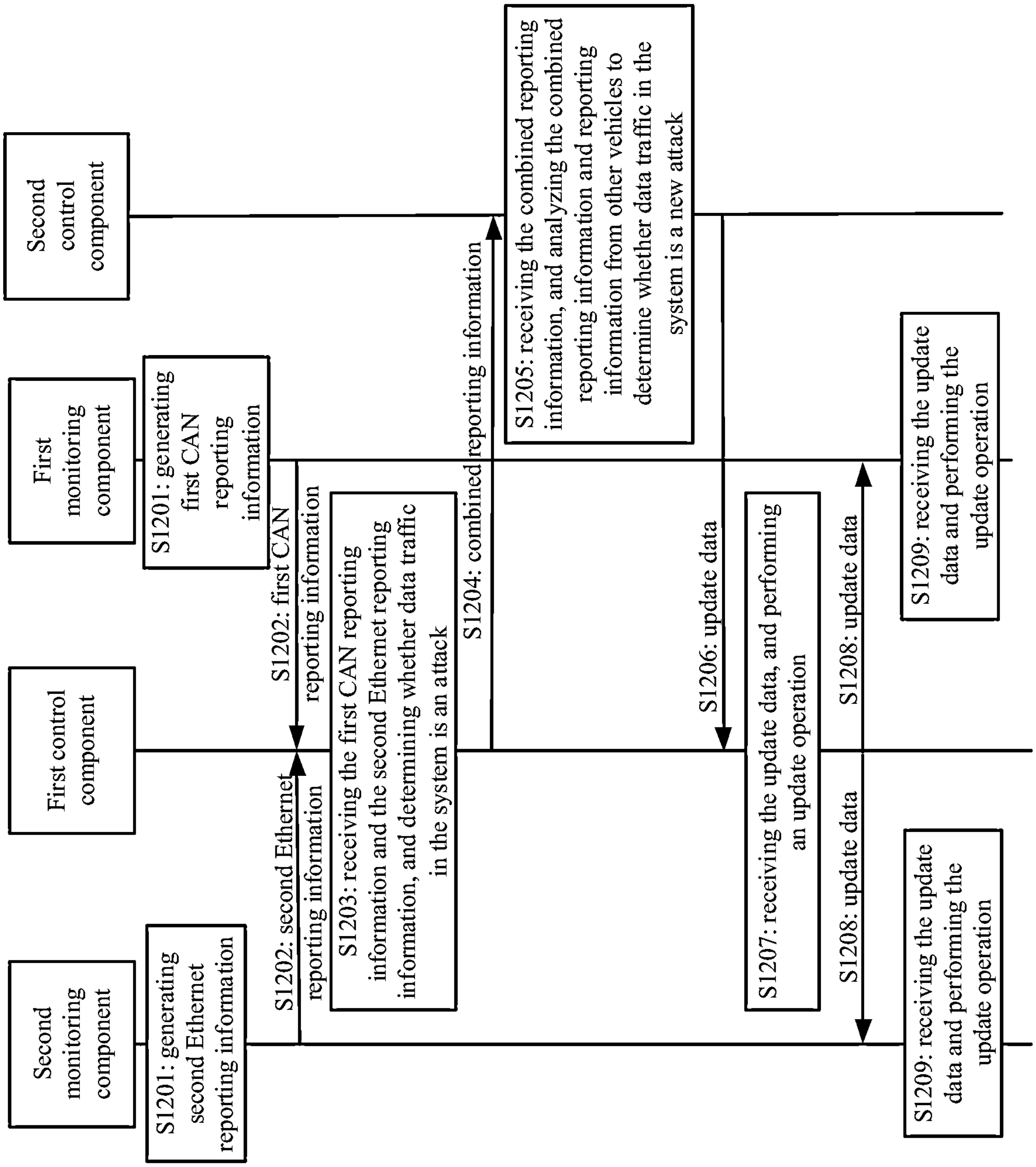
FIG. 12 is a schematic flowchart of an intrusion detection method according to an embodiment of the present disclosure.

The present disclosure also provides an intrusion detection method. The method may be executed by a first control component 601, a first monitoring component 602, a second monitoring component 603 and a second control component 604 shown in FIG. 6*a* and FIG. 6*b*. Reference may be made to the above system embodiments for the operations of the related components and the similar expressions. As shown in FIG. 12, the method 1200 may include:

S1201: the first monitoring component generates first CAN reporting information, and the second monitoring component generates second Ethernet reporting information.

S1202: the first monitoring component transmits the first CAN reporting information to the first control component, and the second monitoring component transmits the second Ethernet reporting information to the first control component.

S1203: the first control component receives the first CAN reporting information and the second Ethernet reporting information, and determines whether data traffic in the system is an attack according to the first CAN reporting information and the second Ethernet reporting information.

In a possible implementation, the first control component analyzes the first CAN reporting information and the second Ethernet reporting information to generate combined reporting information; and determines whether the data traffic is an attack according to the combined reporting information.

In response to determining that the data traffic is an attack, the first control component may perform a preventive operation in response to determining that the data traffic is an attack. In a possible implementation, the preventive operation includes any one or more of following operations: logging of the attack; notification of the attack; initiation of a safe vehicle state process to bring the vehicle into a safe state; or, blocking of the attack.

In response to determining that the data traffic is not an attack, it is possible that the data traffic is a new attack. Therefore, the first control component may transmit the combined information to the second control component for further analysis.

S1204: the first control component transmits the combined reporting information to the second control component.

S1205: the second control component receives the combined reporting information, and analyzes the combined reporting information and reporting information from other vehicles to determine whether data traffic in the system is a new attack.

S1206: the second control component notifies the first control component of update data in response to determining that the data traffic is a new attack.

S1207: the first control component receives the update data from the second control component, and performs an update operation according to the update data.

S1208: the first control component transmits the update data to the first monitoring component and the second monitoring component.

S1209: the first monitoring component receives the update data from the first control component and performs the update operation according to the update data, the second monitoring component receives the update data from the first control component and performs the update operation according to the update data.

In a possible implementation, the update operation includes one or more of the following operations: update of an intrusion detection rule; update of an intrusion signature; update of an intrusion detection algorithm; or, notification of a newly trained model to detect the new attack.

According to the embodiment of the present disclosure, the first control component receives reporting information from both of the monitoring components, thereby linking the two components together by performing a global analysis on the received reporting information, hence rendering it possible to monitor the traffic passing from one network to another network, such as the CAN over IP traffic or the IP over CAN traffic. Besides, the combined reporting information is transmitted to the second control component which has more abundant information on attacks, thus improving the accuracy of the intrusion detection.

The present disclosure also provides an intrusion detection method. The method may be executed by a first control component 1001, a first monitoring component 1002, a third monitoring component 1003, and a second control component 1006 shown in FIG. 10. Reference may be made to the above system embodiments for the operations of the related components and the similar expressions. As shown in FIG. 13, the method 1300 may include:

S1301: the third monitoring component generates third CAN reporting information.

In a possible implementation, third CAN reporting information may be log information of the data traffic.

S1302: the third monitoring component transmits the third CAN reporting information to the first monitoring component.

S1303: the first monitoring component receives the third CAN reporting information, and analyzes the third CAN reporting information to generate first CAN reporting information.

It should be noted that when there is more than one third monitoring component, the first monitoring component may analyze the third CAN reporting information from each third monitoring component to generate the first CAN reporting information.

S1304: the first monitoring component transmits the first CAN reporting information to the first control component.

S1305: the first control component receives the first CAN reporting information, and determines whether data traffic in the system is an attack according to the first CAN reporting information.

In a possible implementation, the first control component analyzes the first CAN reporting information from the first monitoring component to generate combined reporting information; and determines whether the data traffic is an attack according to the combined reporting information. It should be noted that if there is more than one first monitoring component, the first control component may generate the combined reporting information based on the first CAN reporting information from each first monitoring component.

In response to determining that the data traffic is an attack, the first control component may perform a preventive operation in response to determining that the data traffic is an attack. In a possible implementation, the preventive operation includes any one or more of following operations: logging of the attack; notification of the attack; initiation of a safe vehicle state process to bring the vehicle into a safe state; or, blocking of the attack.

In response to determining that the data traffic is not an attack, it is possible that the data traffic is a new attack. Therefore, the first control component may transmit the combined information to the second control component for further analysis.

S1306: the first control component transmits the combined reporting information to the second control component.

S1307: the second control component receives the combined reporting information, and analyzes the combined reporting information and reporting information from other vehicles to determine whether data traffic in the system is a new attack.

S1308: the second control component notifies the first control component of update data in response to determining that the data traffic is a new attack.

S1309: the first control component receives the update data from the second control component, and performs an update operation according to the update data.

S1310: the first control component transmits the update data to the first monitoring component.

S1311: the first monitoring component receives the update data from the first control component and performs the update operation according to the update data.

S1312: the first monitoring component transmits the update data to the third monitoring component.

S1313: the third monitoring component receives the update data and performs the update operation according to the update data.

In a possible implementation, the update operation includes one or more of the following operations: update of an intrusion detection rule; update of an intrusion signature; update of an intrusion detection algorithm; or, notification of a newly trained model to detect the new attack.

Figure 13A:
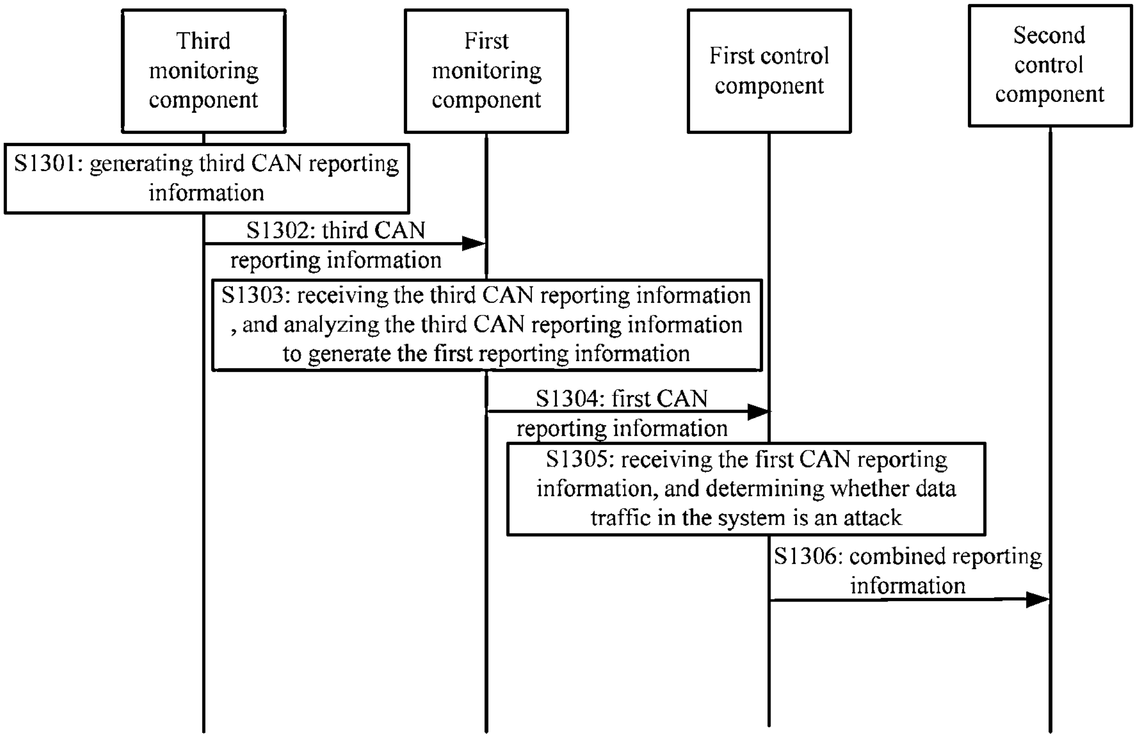
FIG. 13*a* and FIG. 13*b* show a schematic flowchart of an intrusion detection method according to an embodiment of the present disclosure.
Figure 13B:
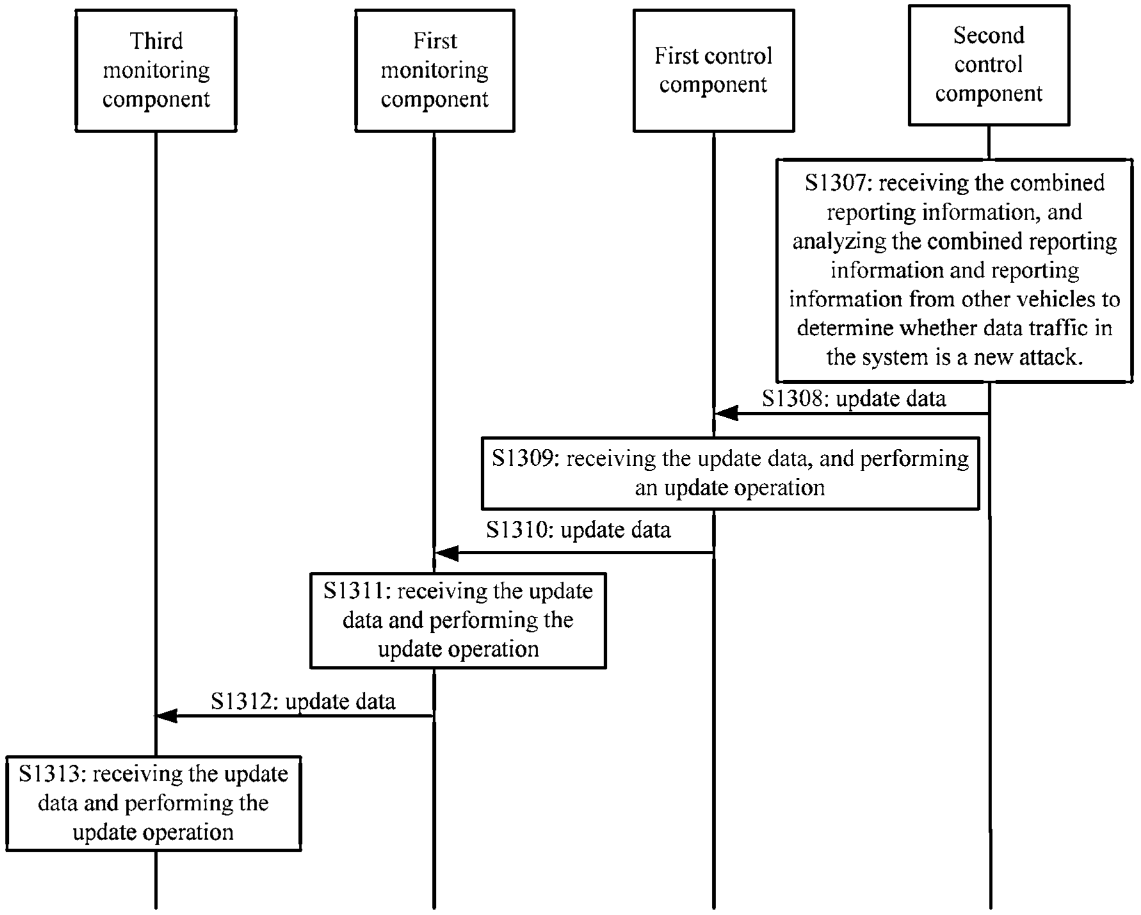

The method depicted in FIG. 13*a* and FIG. 13*b* may be performed by the components shown in FIG. 10, however, it should be understood that the second monitoring component and the fourth monitoring component shown in FIG. 11 may also act in the same way as the first monitoring component and the third monitoring component shown in FIG. 10, which will not be described herein again for brevity.

According to the embodiment of the present disclosure, the third monitoring component, the first monitoring component and the first control component form a hierarchical structure, where the first monitoring component analyzes the information reported by the third monitoring component, and the first control component further analyzes the information reported by the first monitoring component, thereby rendering it possible to detect the advanced attacks within its respective network which individual third monitoring components within that network will not be able to detect, thus improving the accuracy of the intrusion detection. Besides, the combined reporting information generated by the first control component is transmitted to the second control component which has more abundant information on attacks, thus further improving the accuracy of the intrusion detection.

Figure 14:
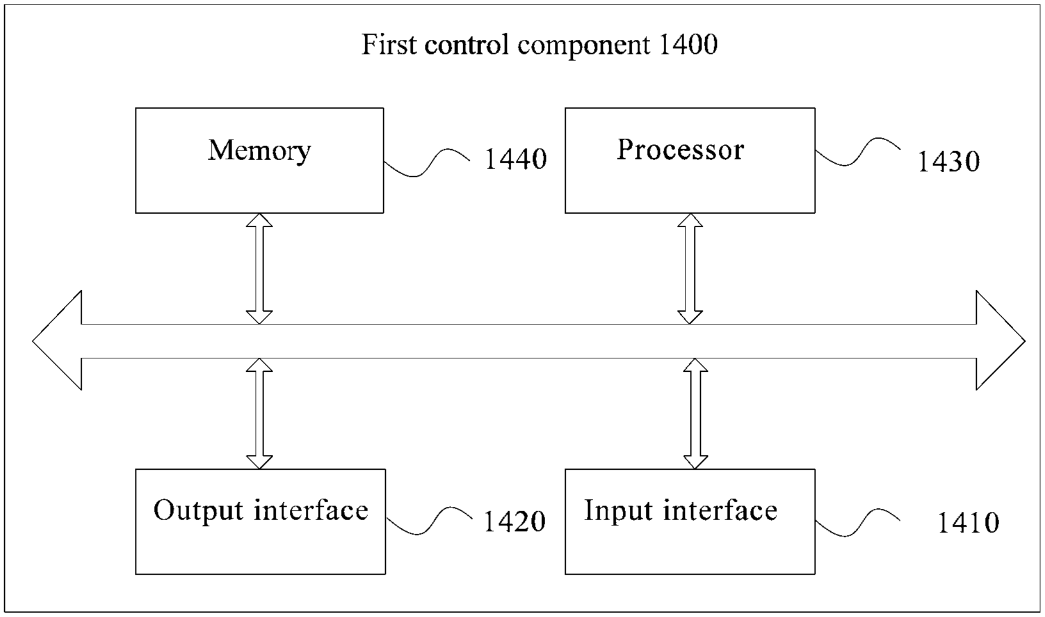
FIG. 14 is a schematic block diagram of a first control component according to an embodiment of the present disclosure.

As shown in FIG. 14, an embodiment of the present disclosure further provides a first control component 1400. The first control component 1400 may be the first control component in the above system embodiments, such as the first control component 601 in FIGS. 6*a*-6*b*, and can be configured to implement content pertaining to the first control component corresponding to the method in the method embodiments. The component 1400 includes an input interface 1410, an output interface 1420, a processor 1430, and a memory 1440. The input interface 1410, the output interface 1420, the processor 1430, and the memory 1440 can be connected by a bus system. The memory 1440 is configured to store programs, instructions or codes. The processor 1430 is configured to execute the programs, the instructions or the codes in the memory 1440 to control the input interface 1410 to receive a signal and control the output interface 1420 to transmit a signal and complete the operations in the foregoing method embodiments.

Figure 15:
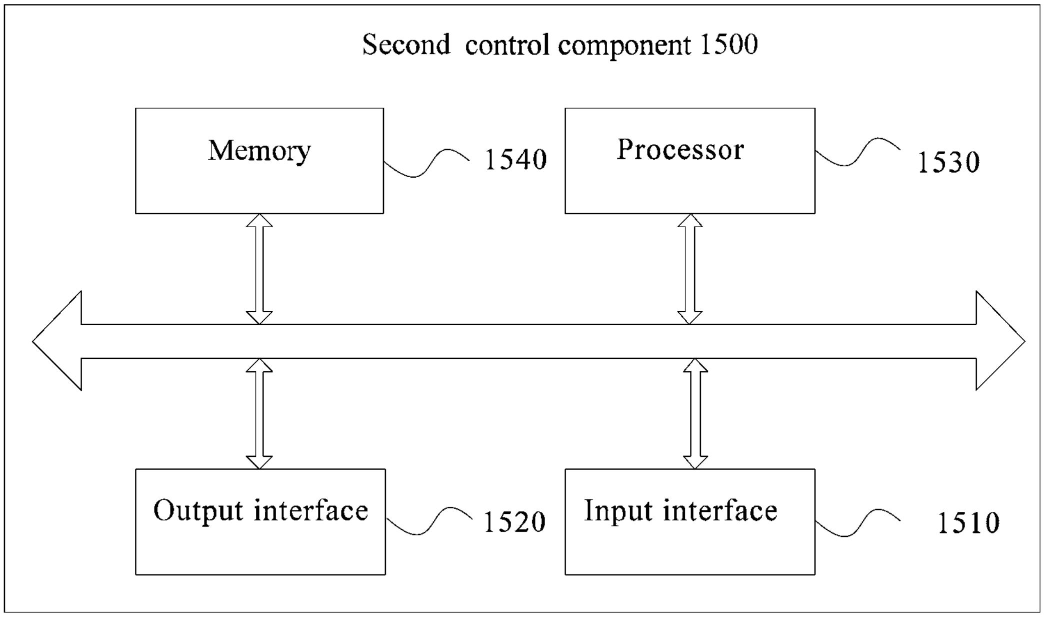
FIG. 15 is a schematic block diagram of a second control component according to an embodiment of the present disclosure.

As shown in FIG. 15, an embodiment of the present disclosure further provides a second control component 1500. The second control component 1500 may be the second control component in the above system embodiments, such as the second control component 604 in FIGS. 6*a*-6*b*, or the second control component 1006 in FIG. 10, and can be configured to implement content pertaining to the second control component corresponding to the method in the method embodiments. The component 1500 includes an input interface 1510, an output interface 1520, a processor 1530, and a memory 1540. The input interface 1510, the output interface 1520, the processor 1530, and the memory 1540 can be connected by a bus system. The memory 1540 is configured to store programs, instructions or codes. The processor 1530 is configured to execute the programs, the instructions or the codes in the memory 1540 to control the input interface 1510 to receive a signal and control the output interface 1520 to transmit a signal and complete the operations in the foregoing method embodiments.

Figure 16:
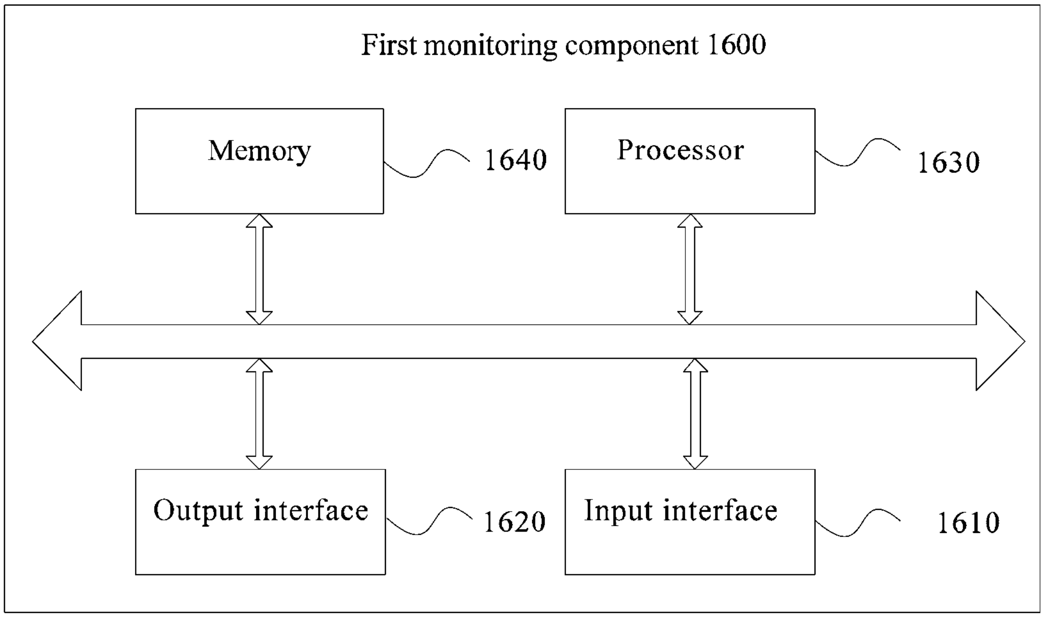
FIG. 16 is a schematic block diagram of a first monitoring component according to an embodiment of the present disclosure.

As shown in FIG. 16, an embodiment of the present disclosure further provides a first monitoring component 1600. The first monitoring component 1600 may be the first monitoring component in the above system embodiments, such as the first monitoring component 602 in FIGS. 6*a*-6*b*, or the first monitoring component 1002 in FIG. 10, and can be configured to implement content pertaining to the first monitoring component corresponding to the method in the method embodiments. The component 1600 includes an input interface 1610, an output interface 1620, a processor 1630, and a memory 1640. The input interface 1610, the output interface 1620, the processor 1630, and the memory 1640 can be connected by a bus system. The memory 1640 is configured to store programs, instructions or codes. The processor 1630 is configured to execute the programs, the instructions or the codes in the memory 1640 to control the input interface 1610 to receive a signal and control the output interface 1620 to transmit a signal and complete the operations in the foregoing method embodiments.

Figure 17:
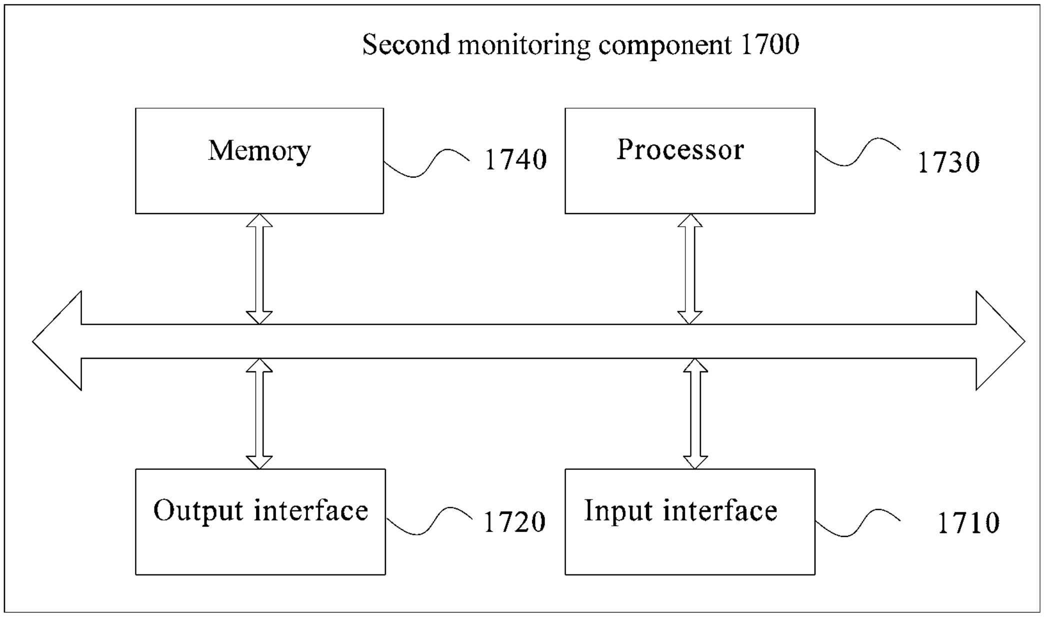
FIG. 17 is a schematic block diagram of a second monitoring component according to an embodiment of the present disclosure.

As shown in FIG. 17, an embodiment of the present disclosure further provides a second monitoring component 1700. The second monitoring component 1700 may be the second monitoring component in the above system embodiments, such as the second monitoring component 603 in FIGS. 6*a*-6*b*, and can be configured to implement content pertaining to the second monitoring component corresponding to the method in the method embodiments. The component 1700 includes an input interface 1710, an output interface 1720, a processor 1730, and a memory 1740. The input interface 1710, the output interface 1720, the processor 1730, and the memory 1740 can be connected by a bus system. The memory 1740 is configured to store programs, instructions or codes. The processor 1730 is configured to execute the programs, the instructions or the codes in the memory 1740 to control the input interface 1710 to receive a signal and control the output interface 1720 to transmit a signal and complete the operations in the foregoing method embodiments.

Figure 18:
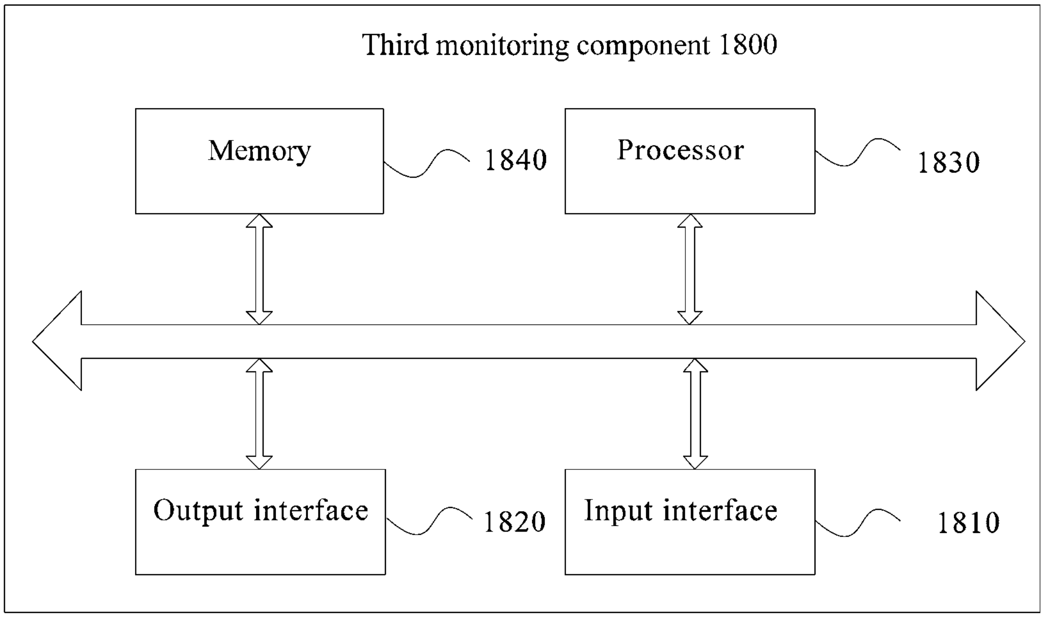
FIG. 18 is a schematic block diagram of a third monitoring component according to an embodiment of the present disclosure.

As shown in FIG. 18, an embodiment of the present disclosure further provides a third monitoring component 1800. The third monitoring component 1800 may be the third monitoring component in the above system embodiments, such as the third monitoring component 1003 in FIG. 10, and can be configured to implement content pertaining to the third monitoring component corresponding to the method in the method embodiments. The component 1800 includes an input interface 1810, an output interface 1820, a processor 1830, and a memory 1840. The input interface 1810, the output interface 1820, the processor 1830, and the memory 1840 can be connected by a bus system. The memory 1840 is configured to store programs, instructions or codes. The processor 1830 is configured to execute the programs, the instructions or the codes in the memory 1840 to control the input interface 1810 to receive a signal and control the output interface 1820 to transmit a signal and complete the operations in the foregoing method embodiments.

The present disclosure also provides a computer storage medium storing computer executable instructions which, when being executed, implement the method according to the embodiments of the present disclosure.

The present disclosure also provides a computer program product is provided, including an instruction which, when executed on a computer, causes a computer to perform the method in the above-mentioned embodiments.

Unlike the existing CAN and Ethernet IDS solutions for automotive where CAN IDS can only monitor CAN traffic inside CAN and Ethernet IDS can only monitor Ethernet traffic inside Ethernet network, the proposed disclosure giving the design and deployment strategy of automotive intrusion detection system can monitor CAN, Ethernet, CAN over IP, and IP over CAN traffic in order to detect any one of the following: attacks with longer paths traversing from one network to another network; related attacks on different networks; advanced attacks involving multiple domains of the same network; new attacks with the help of log information from other vehicles; the proposed solution does not only detect the attacks but also provides an intrusion prevention component to respond to the attacks; the proposed solution further takes care of the working status of the individual IDS components through a hierarchical IDS monitoring system; or the distributed deployment of in-vehicle IDS on more than one switch helps to monitor the traffic taking different routes due to more than one route available in modern cars because of more than one switch in the vehicle.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Terms such as “first”, “second” and the like in the specification and claims of the present disclosure as well as in the above drawings are intended to distinguish different objects, but not intended to define a particular order.

The term such as “and/or” in the embodiments of the present disclosure is merely used to describe an association between associated objects, which indicates that there may be three relationships, for example, A and/or B may indicate presence of A only, of both A and B, and of B only.

In the embodiments of the present disclosure, expressions such as "exemplary" or "for example" are used to indicate illustration of an example or an instance. In the embodiments of the present disclosure, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by obtaining of interoperative hardware units, including one or more processors as described above, in conjunction with suitable software and/or firmware.

The computer-readable non-transitory media includes all types of computer readable media, including magnetic storage media, optical storage media, and solid state storage media and excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In the claims, the word "including" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the disclosure be defined by the claims appended hereto.

What is claimed is:

1. An intrusion monitoring system, comprising: a first monitoring device deployed in a controller area network (CAN), a second monitoring device deployed in an Ethernet network, a first control device, and a plurality of third monitoring devices, wherein both of the first monitoring device and the second monitoring device are connected to the first control device, and wherein the plurality of third monitoring devices are connected to the first monitoring device and deployed in the CAN;

wherein:

the first monitoring device is configured to obtain first CAN reporting information on data traffic in the system and transmit the first CAN reporting information to the first control device, wherein the data traffic in the system is from the CAN to the Ethernet network or from the Ethernet network to the CAN;

the second monitoring device is configured to obtain second Ethernet reporting information on the data traffic and transmit the second Ethernet reporting information to the first control device;

the first control device is configured to receive the first CAN reporting information from the first monitoring device and the second Ethernet reporting information from the second monitoring device, and determine whether the data traffic is an attack according to the first CAN reporting information and the second Ethernet reporting information;

wherein the first monitoring device is deployed in a first switch, and the plurality of third monitoring devices are deployed in one or more second switches outside the first switch;

wherein the plurality of third monitoring devices are configured to generate third CAN reporting information and transmit the third CAN reporting information to the first monitoring device, wherein the third CAN reporting information comprises log information of the data traffic in the respective third monitor devices; and the first monitoring device is configured to monitor a working status of each third monitoring device of the plurality of third monitoring devices and analyze the third CAN reporting information of the plurality of third monitoring devices to obtain the first CAN reporting information and transmit the first CAN reporting information to the first control device.

2. The intrusion monitoring system according to claim 1, wherein the data traffic in the system is from the CAN to the Ethernet network;

the first monitoring device is configured to process the data traffic to generate first CAN reporting information, transmit the first CAN reporting information to the first control device, and pass the processed data traffic to the second monitoring device;

the second monitoring device is configured to receive the processed data traffic from the first monitoring network, process the processed data traffic to generate the second Ethernet reporting information and transmit the second Ethernet reporting information to the first control device; and the first control device is configured to receive the first CAN reporting information from the first monitoring device and the second Ethernet reporting information from the second monitoring device, and determine whether the data traffic is an attack according to the first CAN reporting information and the second Ethernet reporting information.

3. The intrusion monitoring system according to claim 2, wherein the first monitoring device and the second monitoring device are deployed in a same switch, the first control device comprises an intrusion detection system IDS and is deployed inside the switch separated from the first monitoring device and the second monitoring device.

4. The intrusion monitoring system according to claim 2, wherein the first control device is further configured to monitor a working status of the first monitoring device and a working status of the second monitoring device.

5. The intrusion monitoring system according to claim 1, wherein the data traffic in the system is from the Ethernet network to the CAN;

the second monitoring device is configured to process the data traffic to generate second Ethernet reporting information, and transmit the second Ethernet reporting information to the first control device and pass the processed data traffic to the first monitoring device;

the first monitoring device is configured to receive the processed data traffic from the second monitoring network, process the processed data traffic to generate the first CAN reporting information and transmit the first CAN reporting information to the first control device; and the first control device is configured to receive the first CAN reporting information from the first monitoring device and the second Ethernet reporting information from the second monitoring device, and determine whether the data traffic is an attack according to the first CAN reporting information and the second Ethernet reporting information.

6. The intrusion monitoring system according to claim 1, wherein the first control device is further configured to monitor a working status of the first monitoring device.

7. The intrusion monitoring system according to claim 1, further comprising a fourth monitoring device connected to the second monitoring device and deployed in the Ethernet network;

wherein the second monitoring device is deployed in the first switch, and the fourth monitoring device is deployed in the one or more second switches;

wherein the fourth monitoring device is configured to generate fourth Ethernet reporting information and transmit the fourth Ethernet reporting information to the second monitoring device; and the second monitoring device is configured to obtain the second Ethernet reporting information according to the fourth Ethernet reporting information and transmit the second Ethernet reporting information to the first control device.

8. The intrusion monitoring system according to claim 7, wherein the first control device is further configured to monitor a working status of the second monitoring device, and the second monitoring device is further configured to monitor a working status of the fourth monitoring device.

9. The intrusion monitoring system according to claim 1, wherein the first control device is further configured to notify the first monitoring device and the second monitoring device of update data, wherein the update data indicates a strategy for handling a new attack;

the first monitoring device is further configured to receive the update data from the first control device and perform an update operation according to the update data, and the second monitoring device is further configured to receive the update data from the first control device and perform the update operation according to the update data.

10. The intrusion monitoring system according to claim 1, wherein the first control device is further configured to perform a preventive operation in response to determining that the data traffic is an attack.

11. The intrusion monitoring system according to claim 10, wherein the preventive operation comprises any one or more of following operations:

logging of the attack;

notification of the attack;

initiation of a safe vehicle state process to bring the vehicle into a safe state; or, blocking of the attack.

12. An intrusion monitoring method, applied to an intrusion monitoring system comprising a first monitoring device deployed in a controller area network (CAN), a second monitoring device deployed in an Ethernet network, and a first control device, wherein both of the first monitoring device and the second monitoring device are connected to the first control device, wherein the method comprises:

obtaining and transmitting, by the first monitoring device, first CAN reporting information on data traffic in the system to the first control device, wherein the data traffic in the system is from the CAN to the Ethernet network or from the Ethernet network to the CAN;

obtaining and transmitting, by the second monitoring device, second Ethernet reporting information on the data traffic to the first control device; and receiving, by the first control device, the first CAN reporting information from the first monitoring device and the second Ethernet reporting information from the second monitoring device, and determining, by the first control device, whether the data traffic is an attack according to the first CAN reporting information and the second Ethernet reporting information and a complete path of the attack, wherein the method further comprises:

generating, by a plurality of third monitoring devices, third CAN reporting information, wherein the plurality of third monitoring devices are connected to the first monitoring device and deployed in the CAN, wherein the first monitoring device is deployed in a first switch, and the plurality of third monitoring devices are deployed in one or more second switches outside the first switch, and wherein the third CAN reporting information comprises log information of the data traffic in the respective third monitor devices;

transmitting, by the plurality of third monitoring devices, the third CAN reporting information to the first monitoring device;

monitoring, by the first monitoring device, a working status of each third monitoring device of the plurality of third monitoring devices;

analyzing, by the first monitoring device, the third CAN reporting information of the plurality of third monitoring devices to obtain the first CAN reporting information; and transmitting, by the first monitoring device, the first CAN reporting information to the first control device.

13. The intrusion monitoring method according to claim 12, wherein the data traffic in the system is from the CAN to the Ethernet network;

the method further comprises:

processing, by the first monitoring device, the data traffic to generate first CAN reporting information;

transmitting, by the first monitoring device, the first CAN reporting information to the first control device, and passing, by the first monitoring device, the processed data traffic to the second monitoring device;

receiving, by the second monitoring device, the processed data traffic from the first monitoring network;

processing, by the second monitoring device, the processed data traffic to generate the second Ethernet reporting information;

transmitting, by the second monitoring device, the second Ethernet reporting information to the first control device;

receiving, by the first control device, the first CAN reporting information from the first monitoring device and the second Ethernet reporting information from the second monitoring device; and determining, by the first control device, whether the data traffic is an attack according to the first CAN reporting information and the second Ethernet reporting information and the complete path of the attack.

14. The intrusion monitoring method according to claim 12, wherein the data traffic in the system is from the Ethernet network to the CAN;

the method further comprises:

processing, by the second monitoring device, the data traffic to generate second Ethernet reporting information;

transmitting, by the second monitoring device, the second Ethernet reporting information to the first control device and passing, by the second monitoring device, the processed data traffic to the first monitoring device;

receiving, by the first monitoring device, the processed data traffic from the second monitoring network;

processing, by the first monitoring device, the processed data traffic to generate the first CAN reporting information;

transmitting, by the first monitoring device, the first CAN reporting information to the first control device;

receiving, by the first control device, the first CAN reporting information from the first monitoring device and the second Ethernet reporting information from the second monitoring device; and determining, by the first control device, whether the data traffic is an attack according to the first CAN reporting information and the second Ethernet reporting information and complete attack path.

15. The intrusion monitoring method according to claim 12, further comprising:

monitoring, by the first control device, a working status of the first monitoring device and a working status of the second monitoring device.

16. The intrusion monitoring method according to claim 12, further comprising:

monitoring, by the first control device, a working status of the first monitoring device.

17. The intrusion monitoring method according to claim 12, further comprising:

generating, by a fourth monitoring device, fourth Ethernet reporting information, wherein the fourth monitoring device is connected to the second monitoring device and deployed in the Ethernet network, the second monitoring device is deployed in the first switch, and the fourth monitoring device is deployed in the one or more second switches;

transmitting, by the fourth monitoring device, the fourth Ethernet reporting information to the first monitoring device;

obtaining, by the second monitoring device, the second Ethernet reporting information according to the fourth Ethernet reporting information;

transmitting, by the second monitoring device, the second Ethernet reporting information to the first control device.

18. The intrusion monitoring method according to claim 17, further comprising:

monitoring, by the first control device, a working status of the second monitoring device, and monitoring, by the second monitoring device, a working status of the fourth monitoring device.

19. The intrusion monitoring method according to claim 12, further comprising:

performing, by the first control device, a preventive operation in response to determining that the data traffic is an attack.

20. The intrusion monitoring method according to claim 19, wherein the preventive operation comprises any one or more of following operations:

logging of the attack;

notification of the attack;

initiation of a safe vehicle state process to bring the vehicle into a safe state; or blocking of the attack.

* * * * *